(12) United States Patent
Ohara et al.

(10) Patent No.: US 7,800,729 B2
(45) Date of Patent: Sep. 21, 2010

(54) DISPLAY DEVICE AND MANUFACTURING METHOD THEREOF

(75) Inventors: Ken Ohara, Chiba (JP); Tsunenori Yamamoto, Hitachi (JP); Yoshiaki Nakayoshi, Ooamishirasato (JP); Hiroshi Saito, Fujisawa (JP); Jun Ooida, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 90 days.

(21) Appl. No.: 12/071,776

(22) Filed: Feb. 26, 2008

(65) Prior Publication Data

US 2008/0212010 A1 Sep. 4, 2008

(30) Foreign Application Priority Data

Mar. 1, 2007 (JP) ............................. 2007-051711

(51) Int. Cl.
*G02F 1/1333* (2006.01)

(52) U.S. Cl. ..................... 349/143; 349/141; 345/96

(58) Field of Classification Search .............. 349/96, 349/139, 141, 143; 345/96
See application file for complete search history.

(56) References Cited

U.S. PATENT DOCUMENTS 5,738,731 A 4/1998 Shindo et al.

6,961,100 B2 * 11/2005 Song ............................ 349/38
2001/0038432 A1 11/2001 Yanagawa et al.
2005/0122301 A1 * 6/2005 Song ............................ 345/96

FOREIGN PATENT DOCUMENTS

JP 2003-177414 12/1994
JP 2004-213031 2/2004

* cited by examiner

*Primary Examiner*—Akm E Ullah
(74) *Attorney, Agent, or Firm*—Stites & Harbison, PLLC; Juan Carlos A. Marquez, Esq.

(57) ABSTRACT

The present invention provides a liquid crystal display device which can easily prevent the generation of longitudinal smear. The display device includes a display panel having a plurality of scanning signal lines, a plurality of video signal lines, a plurality of thin film transistors and a plurality of pixel electrodes arranged in a matrix array. In a state that a gap between two neighboring video signal lines with one pixel electrode out of the plurality of pixel electrodes sandwiched therebetween in a region where one pixel electrode is arranged is larger than a gap between two neighboring video signal lines with another pixel electrode different from one pixel electrode sandwiched therebetween in a region where another electrode is arranged, a size of one pixel electrode is set larger than a size of another pixel electrode.

1 Claim, 20 Drawing Sheets

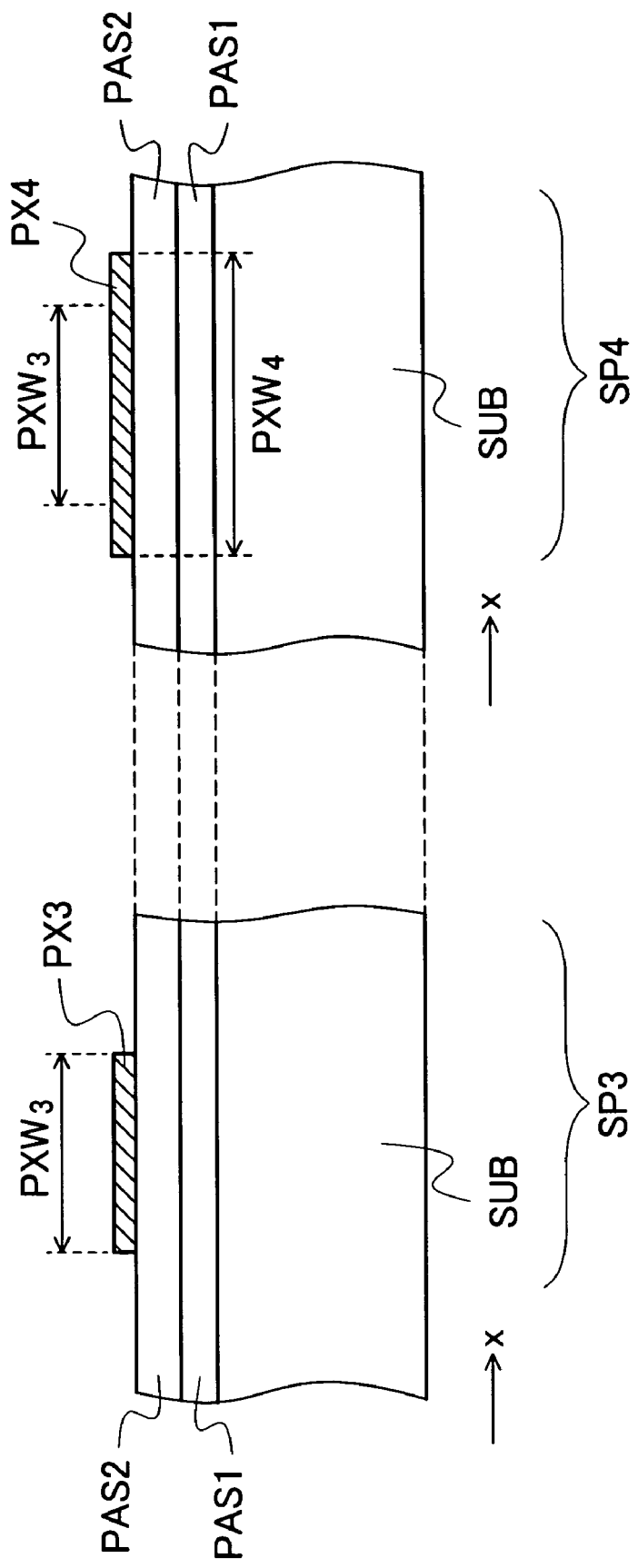

DISPLAY DEVICE AND MANUFACTURING METHOD THEREOF

CROSS-REFERENCE TO RELATED APPLICATIONS

The disclosure of Japanese Patent Application No. 2007-51711 filed on Mar. 1, 2007 including the specification, drawings and abstract is incorporated herein by reference in its entirety.

BACKGROUND

1. Field of the Invention

The present invention relates to a display device and a manufacturing method thereof, and more particularly to a technique which is effectively applicable to a liquid crystal display device and a manufacturing method of the liquid crystal display device.

2. Description of Related Arts

Conventionally, as a display device, there has been known a liquid crystal display device which includes a liquid crystal display panel sealing liquid crystal between two substrates. Further, as a liquid crystal display device, there has been known a so-called active-matrix-type liquid crystal display device.

The active-matrix type liquid crystal display device includes the above-mentioned liquid crystal display panel, a plurality of scanning signal lines, a plurality of video signal lines, a plurality of active elements, a plurality of pixel electrodes, and a counter electrode, wherein the plurality of active elements and the plurality of pixel electrodes are arranged in a matrix array. In the active-matrix-type liquid crystal display device, in general, a TFT (thin film transistor) having the MIS structure (including MOS structure) is used as the active element.

Further, in the liquid crystal display panel, the scanning signal lines, the video signal lines, the TFTs and the pixel electrodes are formed on one substrate (TFT substrate) out of two substrates. Here, the pixel electrode is arranged in a region surrounded by two neighboring scanning signal lines and two neighboring video signal lines, and is connected to either one of a source or a drain of the TFT. Further, a gate of the TFT is connected to the scanning signal line, and either one of the source and the drain of the TFT to which the pixel electrode is not connected is connected to the video signal line.

Further, in the liquid crystal display panel, the pixel electrodes and the counter electrode are electrodes for driving the liquid crystal, wherein the counter electrode may be formed on the TFT substrate or may be formed on another substrate (counter substrate) out of the above-mentioned two substrates.

Here, on the TFT substrate, the pixel electrodes and two neighboring video signal lines arranged close to each other with the pixel electrode sandwiched therebetween are formed by way of an insulation layer, in general. Accordingly, a parasitic capacitance (also referred to as a line capacitance) is formed between the pixel electrode and two video signal lines.

In manufacturing the TFT substrate, the pixel electrode is formed such that a value of the parasitic capacitance formed between the pixel electrode and the video signal line arranged on a left side of the pixel electrode and a value of the parasitic capacitance formed between the pixel electrode and the video signal line arranged on a right side of the pixel electrode have the substantially same value. However, due to the displacement of positions where the video signal lines DL are formed, for example, there may be a case where the values of two parasitic capacitances differ from each other. When the values of two parasitic capacitances formed on the left and right sides of one pixel electrode differ from each other, for example, a potential of the pixel electrode is fluctuated thus giving rise to a phenomenon referred to as a longitudinal smear. Accordingly, in a conventional manufacturing method of a TFT substrate, for example, a thickness of an insulation layer interposed between the video signal line DL and the pixel electrode PX is increased up to a thickness which can prevent the fluctuation of the potential of the pixel electrode attributed to the difference between values of two parasitic capacitances formed on left and right sides of one pixel electrode.

Further, in the conventional liquid crystal display panel, as a method for suppressing a longitudinal smear, there has been proposed a method which forms a shielding electrode, for example. As such a method which forms the shielding electrode, there has been known a method which forms a shielding electrode overlapping a video signal line DL on the counter substrate (see patent document 1 (Japanese Patent Laid-open No. 2004-213031), for example) or a method which forms a shielding electrode between the video signal line and the pixel electrode on the TFT substrate (see patent document 2 (Japanese Patent Laid-open No. 2003-177414), for example).

SUMMARY

The method which forms the shielding electrode on the counter substrate for suppressing the longitudinal smear in the liquid crystal display panel requires, at the time of forming the counter substrate, for example, a step of forming the shielding electrode besides a step of forming a light blocking film which divides a display region for respective pixels and color filters, a step of forming the counter electrode and the like. That is, the number of steps necessary for forming the counter substrate is increased and hence, there arises drawbacks that time necessary for manufacturing the counter substrate is prolonged and, at the same time, a manufacturing cost is increased.

Further, in the method for forming the shielding electrode between the video signal line and the pixel electrode on the TFT substrate, for example, in a step of forming the scanning signal line, the shielding electrode is formed together with the scanning signal line. Accordingly, for example, when the positional displacement is generated, in overlapping the TFT substrate and the counter substrate each other, a numerical aperture is lowered thus giving rise to a drawback that a brightness of the liquid crystal display panel (display device) is lowered.

It is an object of the present invention to provide a technique capable of easily suppressing the generation of longitudinal smear in a liquid crystal display device, for example.

It is a still another object of the present invention to provide a technique capable of preventing the lowering of a numerical aperture while easily suppressing the generation of longitudinal smear in the liquid crystal display device, for example.

It is a still another object of the present invention to provide a technique capable of easily manufacturing a TFT substrate which can suppress the generation of longitudinal smear in the liquid crystal display device, for example.

The above-mentioned and other objects and novel features of the present invention will become apparent from the description of this specification and attached drawings.

To summarize typical inventions among the inventions disclosed in this specification, they are as follows.

(1) According to a first aspect of the present invention, there is provided a display device including a display panel having a plurality of scanning signal lines, a plurality of video signal lines, a plurality of thin film transistors and a plurality of pixel electrodes arranged in a matrix array, wherein provided that a gap between two neighboring video signal lines with one pixel electrode out of the plurality of pixel electrodes sandwiched therebetween in a region where one pixel electrode is arranged is larger than a gap between two neighboring video signal lines with another pixel electrode different from one pixel electrode sandwiched therebetween in a region where another electrode is arranged, a size of one pixel electrode in the direction of the gap of the video signal lines is set larger than a size of another pixel electrode in the direction of the gap of the video signal lines.

(2) In the display device having the constitution described in (1), a gap between one pixel electrode and one video signal line out of two video signal lines and a gap between one pixel electrode and another video signal line out of two video signal lines are set substantially equal to each other, a gap between another pixel electrode and one video signal line out of two video signal lines and a gap between another pixel electrode and another video signal line out of two video signal lines are set substantially equal to each other, the gap between one pixel electrode and another video signal line out of two video signal lines and the gap between another pixel electrode and one video signal line out of two video signal lines are set substantially equal to each other, and the gap between one pixel electrode and another video signal line out of two video signal lines and the gap between another pixel electrode and another video signal line out of two video signal lines are set substantially equal to each other.

(3) In the display device having the constitution described in (1) or (2), assuming a distance between two most spaced-apart pixel electrodes out of the plurality of pixel electrodes arranged in a matrix array as $L_{DA}$, the difference in etching quantity generated with respect to a size of the pixel electrode in the direction of the gap of the video signal lines at two positions spaced apart from each other by the distance $L_{DA}$ as σ, a size of one pixel electrode in the direction of the gap of the video signal lines as PXW, and a gap between one predetermined pixel electrode and the predetermined video signal line as $DPG_{min}$, the relationship between a gap DPGL between one pixel electrode and one video signal line out of two video signal lines and a gap DPGR between one pixel electrode and another video signal line out of two video signal lines satisfies following formula 1 to formula 3.

$$DPGL+\sigma/L_{DA}\cdot PXW>DPGR>DPGL-\sigma/L_{DA}\cdot PXW \quad \text{(formula 1)}$$

$$DPGL>DPG_{min}-\sigma/L_{DA}\cdot PXW \quad \text{(formula 2)}$$

$$DPGR>DPG_{min}-\sigma/L_{DA}\cdot PXW \quad \text{(formula 3)}$$

(4) In the display device having the constitution described any one of (1) to (3), the display panel is a liquid crystal display panel which seals liquid crystal between two substrates.

(5) According to a second aspect of the present invention, there is provided a manufacturing method of a display device which forms a plurality of scanning signal lines, a plurality of video signal lines, a plurality of TFTs and a plurality of pixel electrodes on a surface of an insulating substrate, the manufacturing method comprising the steps of: forming the plurality of video signal lines; forming the plurality of pixel electrodes after the step of forming the plurality of video signal lines, the step including a step of forming a conductive film, a step of forming a photosensitive resist on the conductive film, a step of exposing the photosensitive resist using predetermined size data, a step of developing the exposed photosensitive resist, and a step of etching the conductive film using the photosensitive resist acquired by developing as a mask; a first step of measuring positions and line widths of the video signal lines formed on the insulating substrate between the step of forming the plurality of video signal lines and the step of forming the plurality of pixel electrodes; and a second step of correcting either one of or both of forming positions and sizes of the plurality of pixel electrodes out of the predetermined size data based on a result of the measurement in the first step between the step of forming the plurality of video signal lines and the step of forming the plurality of pixel electrodes, wherein provided that the size data is corrected in the second step, the photosensitive resist is exposed using the corrected size data in the step of exposing the photosensitive resist.

(6) In a manufacturing method of a display device having the constitution described in (5), the step of exposing the photosensitive resist divides a region in which the photosensitive resist is formed into a large number of micro regions, and the large number of micro regions are allocated to the micro regions which are exposed and the micro regions which are not exposed based on the predetermined size data or the corrected size data and, thereafter, the micro regions which are exposed are sequentially or collectively exposed.

(7) In a manufacturing method of a display device having the constitution described in (5) or (6), in the second step, the size data is corrected such that based on the positions and the line widths of two neighboring video signal lines with the pixel electrode sandwiched therebetween in a region where the pixel electrode is formed, a gap between the pixel electrode and one of two video signal lines and a gap between the pixel electrode and another video signal line out of two video signal lines assume the same value, and gaps between the respective pixel electrodes and one video signal lines of the respective two video signal lines assume the same value and, at the same time, the gaps between the respective pixel electrodes and another video signal lines of the respective two video signal lines assume the same value.

(8) In a manufacturing method of a display device having the constitution described in any one of (5) to (7), in the first step, a region where the plurality of pixel electrodes are formed is divided into small regions which are smaller than the pixel electrodes in number, and the position and the line width of the video signal line in a region which belongs to one small region and in which the plurality of pixel electrodes are formed are estimated from the position and the line width of the video signal line at a representative point in one small region.

According to the present invention, a value of a parasitic capacitance formed between the pixel electrode and the video signal line arranged on a left side of the pixel electrode and a value of a parasitic capacitance formed between the pixel electrode and the video signal line arranged on a right side of the pixel electrode can be set to the substantially same value and hence, the generation of longitudinal smear can be easily suppressed.

Further, according to the present invention, the generation of longitudinal smear can be suppressed by correcting forming positions or sizes of the pixel electrodes thus preventing lowering of a numerical aperture.

Still further, according to the present invention, it is possible to easily manufacture a TFT substrate which can suppress the generation of longitudinal smear in the liquid crystal display device.

BRIEF DESCRIPTION OF DRAWINGS

FIG. 10B is a schematic cross-sectional view showing one example of irregularities in etching quantity in two pixels SP3, SP4 diagonally positioned in the display region DA shown in FIG. 10A.

DETAILED DESCRIPTION OF THE INVENTION

Hereinafter, the present invention is explained in detail in conjunction with embodiments by reference to drawings. Here, in all drawings for explaining the embodiments, parts having identical functions are given same symbols and their repeated explanation is omitted.

Figure 1A:
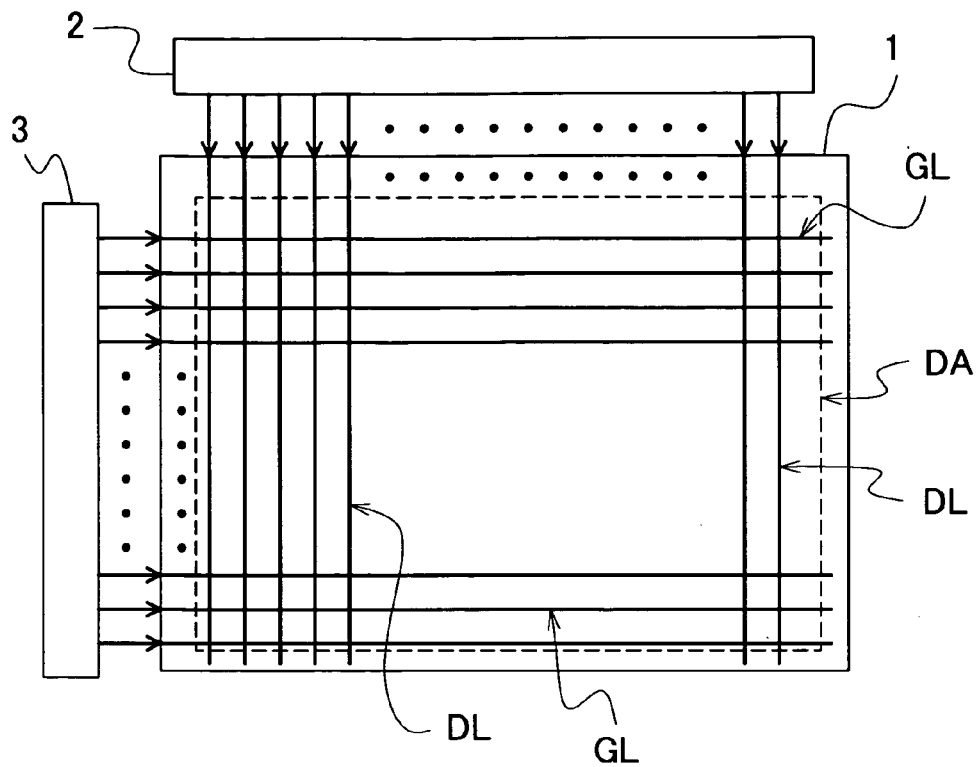
FIG. 1A is a schematic view showing one example of the schematic constitution of a liquid crystal display device according to the present invention.

FIG. 1A is a schematic view showing one example of the schematic constitution of a liquid crystal display device according to the present invention.

Figure 1B:
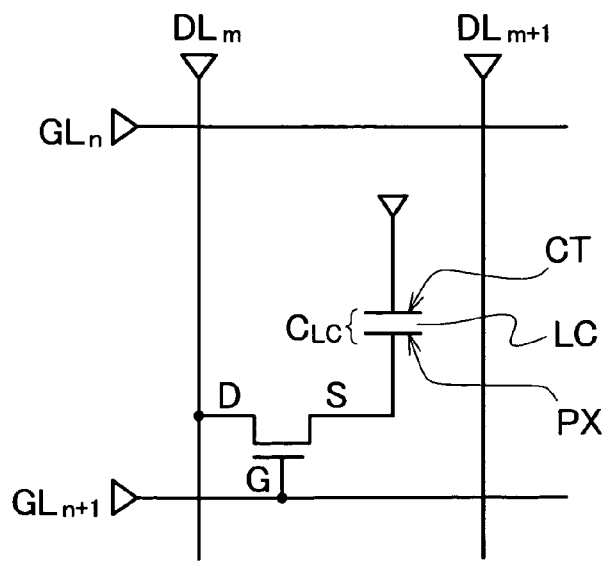
FIG. 1B is a schematic circuit diagram showing one example of the circuit constitution of one pixel of a liquid crystal display panel shown in FIG. 1A.

FIG. 1B is a schematic circuit diagram showing one example of the circuit constitution of one pixel of a liquid crystal display panel shown in FIG. 1A.

The present invention is, for example, applicable to an active-matrix-type TFT liquid crystal display device.

The active-matrix-type TFT liquid crystal display device includes, as shown in FIG. 1A, a liquid crystal display panel 1, a data driver 2 and a gate driver 3, for example. Here, although not shown in FIG. 1A, the TFT liquid crystal display device includes, besides the above-mentioned parts, a control circuit for controlling operations of the data driver 2 and the gate driver 3 and the like. Further, when the TFT liquid crystal display device is a transmissive or transflective TFT liquid crystal display device, the TFT liquid crystal display device also includes a backlight unit (light source).

The liquid crystal display panel 1 includes a plurality of scanning signal lines GL, a plurality of video signal lines DL, and a large number of active elements (also referred to as switching elements) arranged on a display region DA in a matrix array. The scanning signal lines GL and the video signal lines DL are formed with an insulation layer sandwiched therebetween, and one video signal line DL stereoscopically intersects the plurality of scanning signal lines GL by way of the insulation layer. In the liquid crystal display panel 1, the active element is a TFT (Thin Film Transistor) having the MIS structure (including the MOS structure).

The display region DA of the liquid crystal display panel 1 is constituted of a large number of pixels which is arranged in the extending direction of the scanning signal lines GL and in the extending direction of the video signal lines DL, and an area which one pixel occupies corresponds to a region surrounded by two neighboring scanning signal lines GL and two neighboring video signal lines DL.

When the TFT used as the active element is provided at a rate of one TFT for one pixel, the TFT arranged in a region (a pixel) surrounded by two neighboring scanning signal lines $GL_n$, $GL_{n+1}$ (n being an integer larger than 1) and two neighboring video signal lines $DL_m$, $DL_{m+1}$ (m being an integer larger than 1), for example, as shown in FIG. 1B, has a gate (G) thereof connected to the scanning signal line $GL_{n+1}$ and a drain (D) thereof connected to the video signal line $DL_m$. Further, a source (S) of the TFT is connected to a pixel electrode PX arranged in the region surrounded by two neighboring scanning signal lines $GL_n$, $GL_{n+1}$ and two neighboring video signal lines $DL_m$, $DL_{m+1}$. The pixel electrode PX forms a pixel capacitance (also referred to as a liquid crystal capacitance) $C_{LC}$ together with a counter electrode CT (also referred to as a common electrode) and the liquid crystal LC.

Here, in this specification, with respect to the drain (D) and the source (S) of the TFT, either one of these parts connected to the video signal line DL is referred to as the drain (D), and another part connected to the pixel electrode PX is referred to as a source (S). However, the drain (D) and the source (S) may be referred in an opposite manner, that is, the part connected to the video signal line DL may be referred to as the source (S), and the part connected to the pixel electrode PX may be referred to as the drain (D).

Further, the gate of the TFT arranged in the region (pixel) surrounded by two neighboring scanning signal lines $GL_n$, $GL_{n+1}$ and two neighboring video signal lines $DL_m$, $DL_{m+1}$ may be connected to the scanning signal line $GL_n$. In the same manner, the drain of the TFT arranged in the region (pixel) surrounded by two neighboring scanning signal lines $GL_n$, $GL_{n+1}$ and two neighboring video signal lines $DL_m$, $DL_{m+1}$ may be connected to the video signal line $DL_{m+1}$.

Figure 2A:
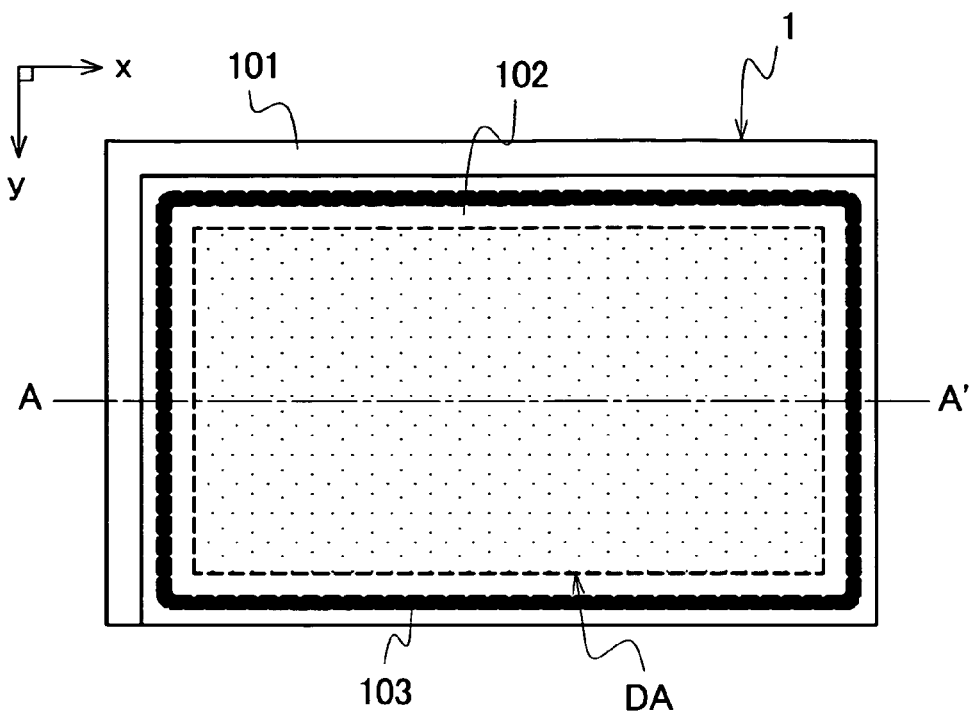
FIG. 2A is a schematic plan view showing one example of the schematic constitution of the liquid crystal display panel.
Figure 2B:
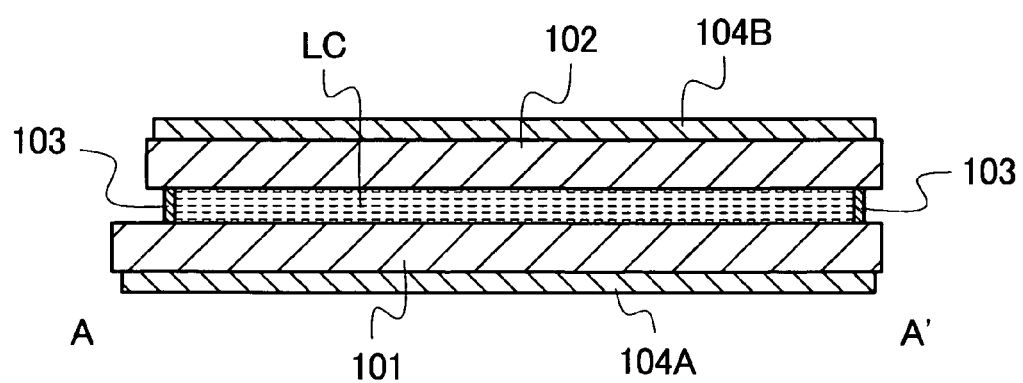
FIG. 2B is a schematic cross-sectional view taken along a line A-A' in FIG. 2A.

FIG. 2A is a schematic plan view showing one example of the schematic constitution of the liquid crystal display panel. FIG. 2B is a schematic cross-sectional view taken along a line A-A' in FIG. 2A.

For example, as shown in FIG. 2A and FIG. 2B, the liquid crystal display panel 1 is constituted of a pair of substrates consisting of a TFT substrate 101 and a counter substrate 102 with the liquid crystal LC hermetically sealed therebetween. Here, the TFT substrate 101 and the counter substrate 102 are adhered to each other using an annular sealing material 103 surrounding the display region DA, and the liquid crystal LC is hermetically sealed in a space surrounded by the TFT substrate 101, the counter substrate 102 and the sealing material 103.

Further, when the liquid crystal display panel 1 is of a transmissive type or transflective type, for example, polarizers 104A, 104B are respectively formed on surfaces of the TFT substrate 101 and the counter substrate 102 facing the outside. Further, for example, between the TFT substrate 101 and the polarizer 104A and between the counter substrate 102 and the polarizer 104B, a one-layered or a multi-layered phase difference plate is arranged respectively.

Further, when the liquid crystal display panel 1 is of a reflective-type, the polarizer 104A and the phase difference plate on a TFT-substrate-101 side are unnecessary in general.

Figure 3A:
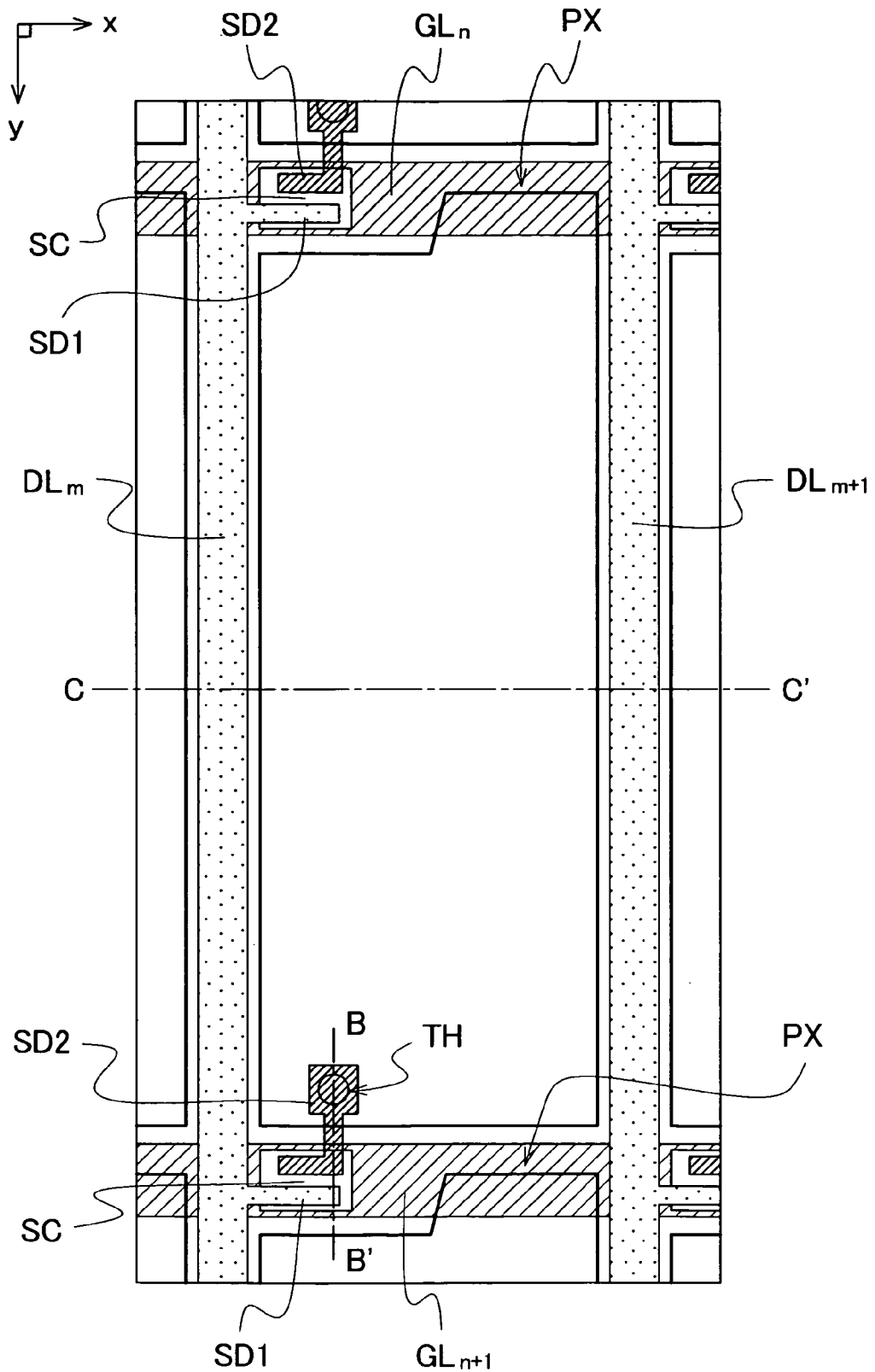
FIG. 3A is a schematic plan view showing one example of the constitution of one pixel on a TFT substrate of the liquid crystal display panel.
Figure 3B:
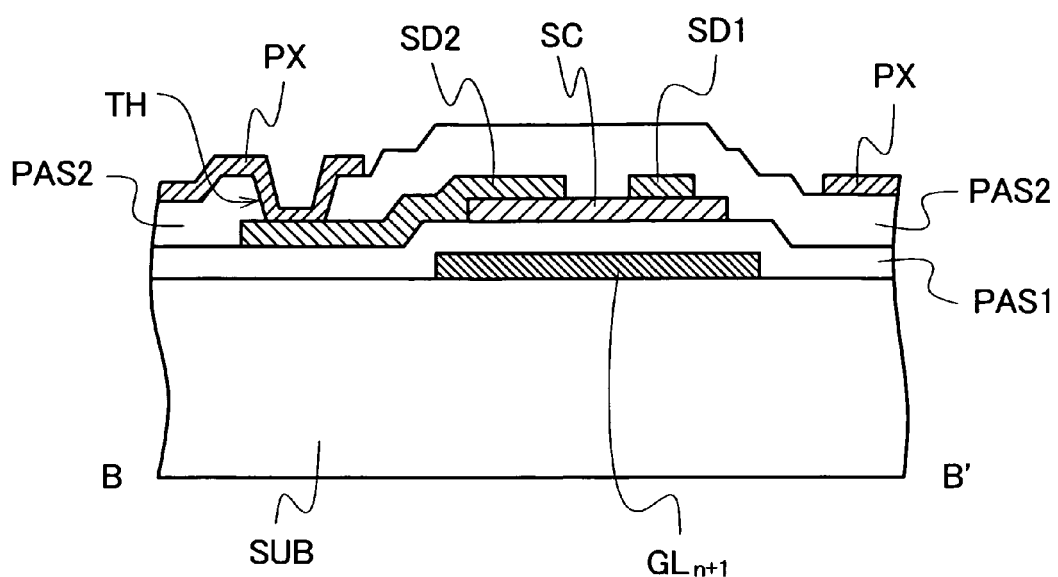
FIG. 3B is a schematic cross-sectional view taken along a line B-B' in FIG. 3A.
Figure 3C:
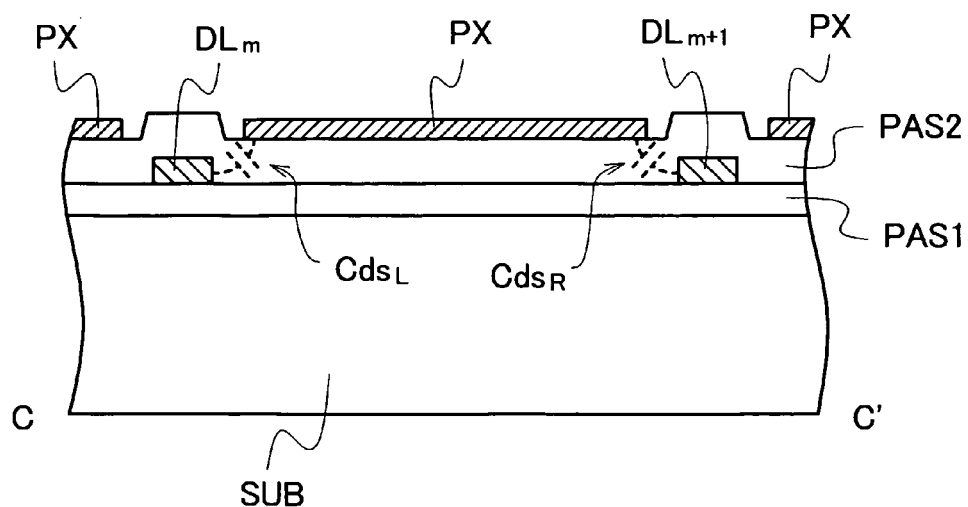
FIG. 3C is a schematic cross-sectional view taken along a line C-C' in FIG. 3A.

FIG. 3A is a schematic plan view showing one example of the constitution of one pixel on the TFT substrate of the liquid crystal display panel. FIG. 3B is a schematic cross-sectional view taken along a line B-B' in FIG. 3A. FIG. 3C is a schematic cross-sectional view taken along a line C-C' in FIG. 3A.

When the liquid crystal display panel 1 is of a transmissive type and adopts a vertical electric field driving method such as a TN method or a VA method, on the TFT substrate 101, among the parts shown in FIG. 1A and FIG. 1B, the scanning signal lines GL, the video signal lines DL, the TFTs which constitute the active elements, and the pixel electrodes PX are formed.

Here, for example, the constitution of one pixel on the TFT substrate 101 is configured as shown in FIG. 3A to FIG. 3C. That is, on a front surface of an insulating substrate SUB formed of a glass substrate or the like, the scanning signal lines GL ($GL_n$, $GL_{n+1}$), a first insulation layer PAS1, a semiconductor layer SC, the video signal lines DL ($DL_m$, $DL_{m+1}$), drain electrodes SD1, source electrodes SD2, a second insulation layer PAS2, and the pixel electrodes PX are stacked. Further, the pixel electrode PX is connected to the source electrode SD2 by way of a through hole TH.

The scanning signal line GL ($GL_n$, $GL_{n+1}$) is, for example, a conductive layer formed by etching a first conductive film made of metal such as aluminum.

The semiconductor layer SC formed on the scanning signal line GL by way of the first insulation layer PAS1 is a semiconductor layer formed by etching a semiconductor film made of amorphous silicon, for example, and functions as a semiconductor layer of the TFT. Here, the semiconductor layer SC includes three regions consisting of a drain region, a source region, and a channel region. Further, the first insulation layer PAS1 is, for example, an insulation layer formed of a silicon oxide film, and functions as a gate insulation film of the TFT.

The video signal lines DL ($DL_m$, $DL_{m+1}$), the drain electrode SD1, and the source electrode SD2 are respectively constituted of a conductive layer formed by etching a second conductive film made of metal such as aluminum, for example. Here, the drain electrode SD1 is integrally formed with the video signal line DL, for example. Further, the drain electrode SD1 is in contact with the drain region of the semiconductor layer SC, and the source electrode SD2 is in contact with the source region of the semiconductor layer SC.

The pixel electrode PX mounted on a surface of the insulating substrate SUB on which the video signal lines DL and the like are formed by way of the second insulation layer PAS2 is, for example, a conductive layer formed by etching a third conductive film formed of a conductive body having high light transmissivity such as ITO, and is connected to the source electrode SD2 by way of a through hole TH formed in the second insulation layer PAS2. Further, the pixel electrode PX includes a portion overlapping the scanning signal line $GL_n$ to which the gate of the TFT including the source electrode SD2 connected to the pixel electrode PX is not connected as viewed in a plan view out of two neighboring scanning signal lines $GL_n$, $GL_{n+1}$, for example. Here, in a region where the pixel electrode PX and the scanning signal line $GL_n$ overlap each other as viewed in a plan view, a holding capacitance (also referred to as an auxiliary capacitance) is formed.

Here, the above-mentioned "plan view" indicates a plan view shown in FIG. 3A, that is, a plan view when the TFT substrate 101 (liquid crystal display panel 1) is viewed from an observer side. Further, other plan views used in this specification for the explanation of the present invention are plan views shown in FIG. 3A, that is, plan views when the TFT substrate 101 (liquid crystal display panel 1) is viewed from the observer side.

In the liquid crystal display panel 1 having such a TFT substrate 101, for example, as shown in FIG. 3C, a parasitic capacitance $Cds_L$ is formed between the pixel electrode PX and the video signal line $DL_m$, and a parasitic capacitance $Cds_R$ is formed between the pixel electrode PX and the video signal line $DL_{m+1}$.

Although not shown in FIG. 3B and FIG. 3C, on a surface of the insulating substrate SUB on which the pixel electrodes PX are formed, for example, an orientation film is formed. A surface of the TFT substrate 101 on which the orientation film is formed faces the counter substrate 102 by way of the liquid crystal LC.

Further, although the detailed explanation is omitted, the counter substrate 102 is constituted by forming a light blocking film which divides the display region DA into regions for respective pixels, color filters, the counter electrode CT, and the orientation film on a surface of an insulating substrate formed of a glass substrate or the like, for example.

Hereinafter, an embodiment of the present invention is explained by taking the TFT substrate 101 in which one pixel has the constitution shown in FIG. 3A to FIG. 3C as an example.

Embodiment

FIG. 4 and FIG. 5A to FIG. 5C are schematic views for explaining a manufacturing method of a TFT substrate of one embodiment according to the present invention.

Figure 4:
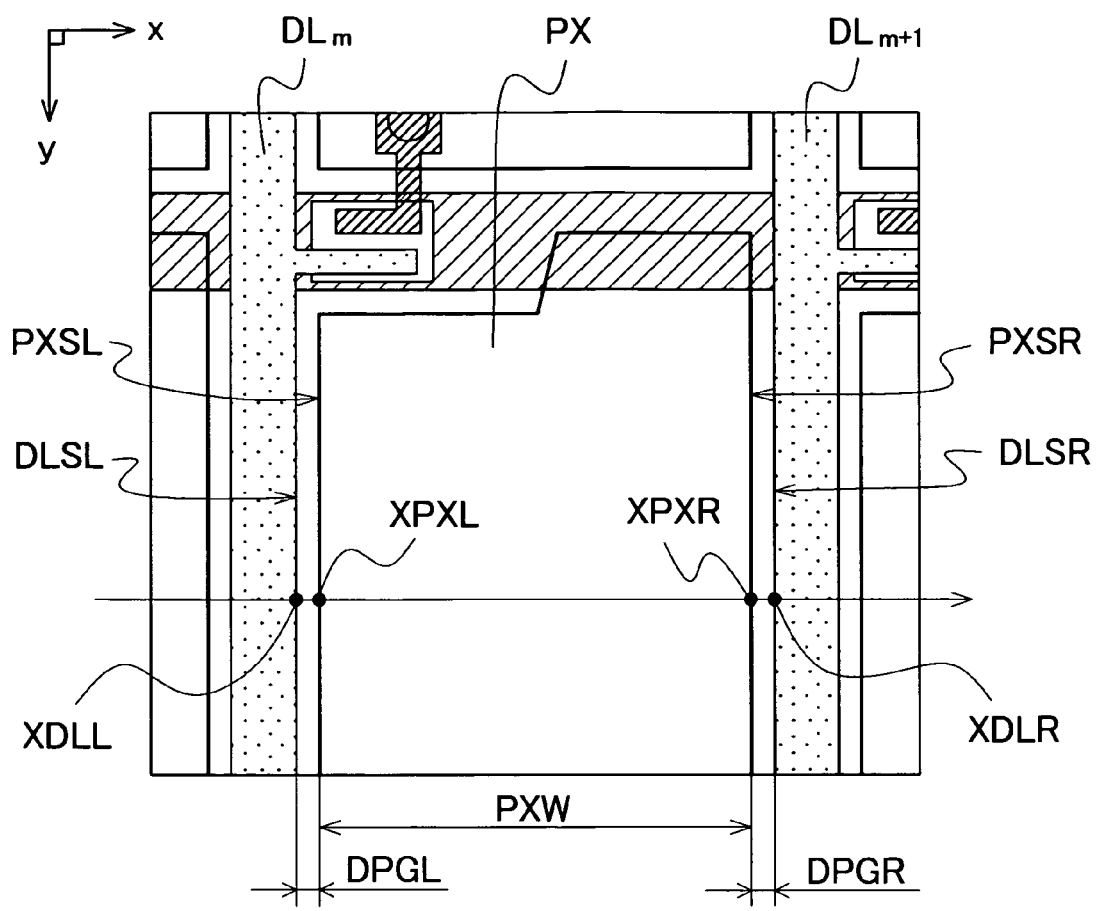
FIG. 4 is a schematic plan view for explaining a summary of a manufacturing method of a TFT substrate of this embodiment.
Figure 5A:
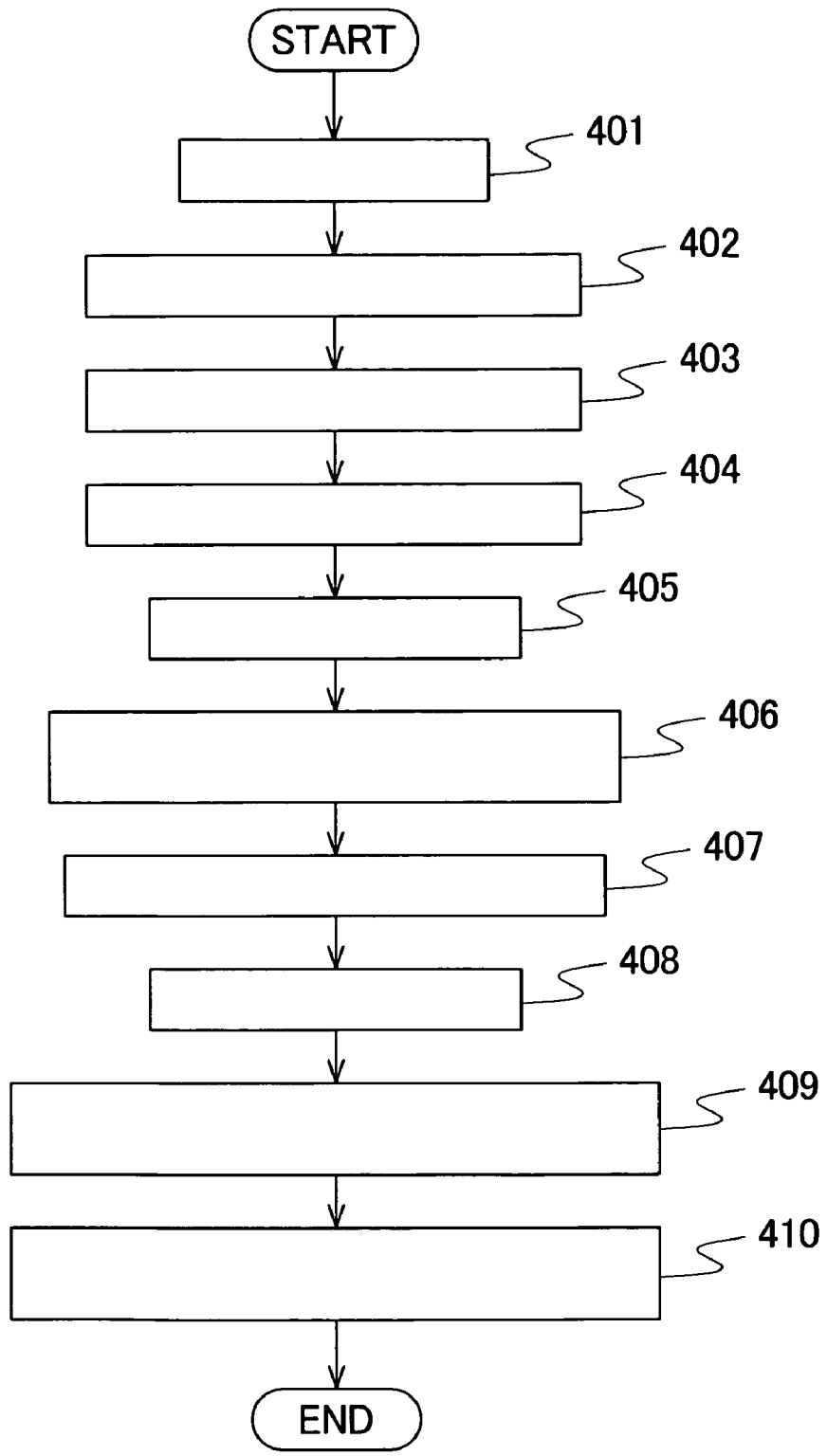
FIG. 5A is a schematic flowchart for explaining one example of manufacturing steps of the TFT substrate of this embodiment.
Figure 5B:
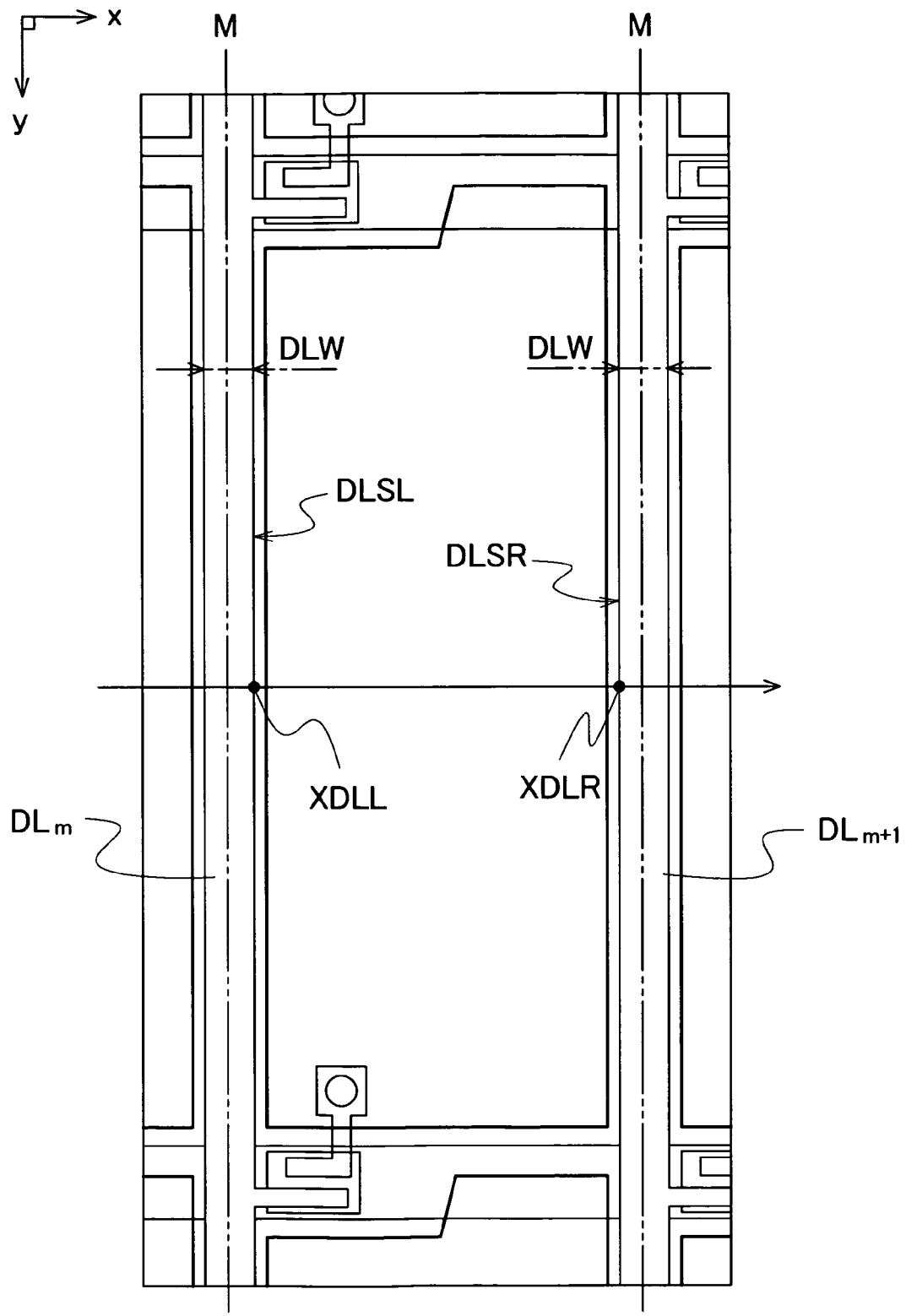
FIG. 5B is a schematic plan view for explaining a measuring method of a position and a line width of a video signal line.
Figure 5C:
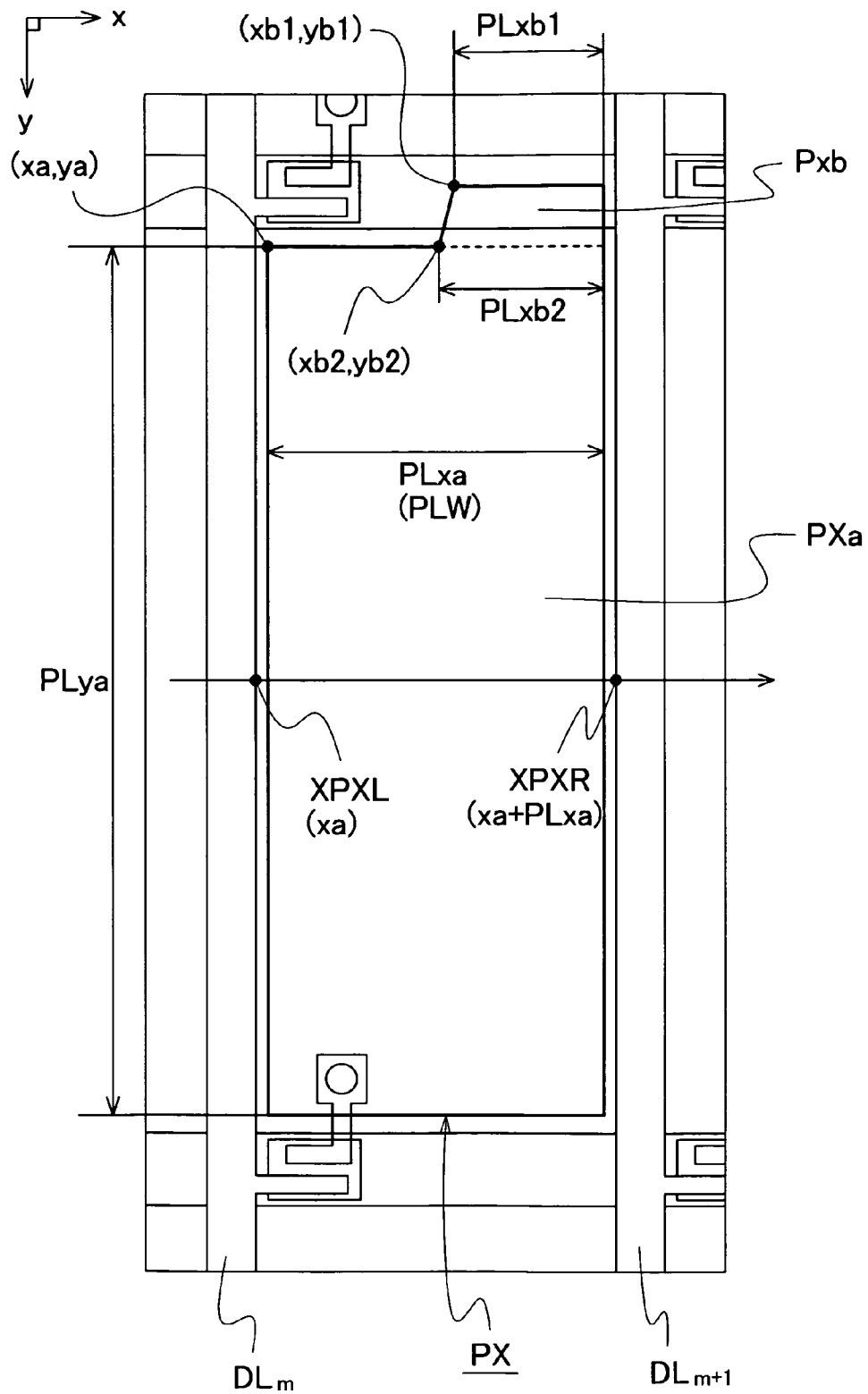
FIG. 5C is a schematic plan view for explaining one example of a form of size data of a pixel electrode.

FIG. 4 is a schematic plan view for explaining a summary of the manufacturing method of the TFT substrate of this embodiment. FIG. 5A is a schematic flowchart for explaining one example of manufacturing steps of the TFT substrate of this embodiment. FIG. 5B is a schematic plan view for explaining a measuring method of positions and line widths of video signal lines. FIG. 5C is a schematic plan view for explaining one example of a form of size data of a pixel electrode.

In the TFT substrate 101 in which one pixel has the constitution shown in FIG. 3A to FIG. 3C, the pixel electrode PX arranged in the region surrounded by two neighboring scanning signal lines $GL_n$, $GL_{n+1}$ and two neighboring video signal lines $DL_m$, $DL_{m+1}$ is usually arranged to make a value of a parasitic capacitance $Cds_L$ formed between the pixel electrode PX and the video signal line $DL_m$ and a value of a parasitic capacitance $Cds_R$ formed between the pixel electrode PX and the video signal line $DL_{m+1}$ equal to each other. That is, the pixel electrode PX arranged between two neighboring video signal lines $DL_m$, $DL_{m+1}$ is, for example, as shown in FIG. 4, formed at a position where a gap DPGL between the pixel electrode PX and the video signal line $DL_m$ and the gap DPGR between the pixel electrode PX and the video signal line $DL_{m+1}$ assume the substantially same value.

Here, the gap DPGL between the pixel electrode PX and the video signal line $DL_m$ is a distance between the pixel electrode PX and the video signal line $DL_m$ as viewed in a plan view, and the gap DPGL corresponds to the difference XPXL–XDLL between a position XPXL in the x direction of a side PXSL of the pixel electrode PX which faces the video signal line $DL_m$ in an opposed manner, and a side DLSL of the video signal line $DL_m$ which faces the video signal line $DL_{m+1}$ in an opposed manner. In the same manner, the gap DPGR between the pixel electrode PX and the video signal line $DL_{m+1}$ is a distance between the pixel electrode PX and the video signal line $DL_{m+1}$ as viewed in a plan view, and the gap DPGR corresponds to the difference XDLR–XPXR between a position a position XDLR in the x direction of a side DLSR of the video signal line $DL_{m+1}$ which faces the video signal line $DL_m$ in an opposed manner and a position XPXR in the x direction of a side PXSR of the pixel electrode PX which faces the video signal line $DL_{m+1}$ in an opposed manner.

However, in a conventional manufacturing method of the TFT substrate 101, for example, there may be a case that positions of the formed video signal lines DL ($DL_m$, $DL_{m+1}$) in the x direction are displaced so that the gap DPGL between the pixel electrode PX and the video signal line $DL_m$ and the gap DPGR between the pixel electrode PX and the video signal line $DL_{m+1}$ assume values different from each other. Further, for example, widths (sizes in the x direction) of the formed video signal lines DL become irregular and hence, for example, the gap DPGL (DPGR) in one pixel and the gap DPGL (DPGR) in another pixel may assume values different from each other.

A manufacturing method of the TFT substrate 101 of this embodiment is a manufacturing method which, even when the above-mentioned displacement of the formed positions of the video signal lines DL or the irregularities of widths occur, two gaps DPGL, DPGR in one pixel assume the substantially same value and, at the same time, the gaps DPGL (DPGR) in all pixels also assume the substantially same value.

In the manufacturing method of the TFT substrate 101 in this embodiment, for example, as shown in FIG. 5A, first of all, the scanning signal lines GL are formed on a surface of the insulating substrate SUB formed of a glass substrate or the like (step 401). Since step 401 adopts the processing equal to the processing in a step of forming the scanning signal lines GL in the conventional manufacturing method of the TFT substrate 101, the detailed explanation of the step is omitted.

Next, the first insulation layer PAS1 and the semiconductor layer SC are formed (step 402). Since step 402 adopts the processing substantially equal to the processing in a step of forming the first insulation layer PAS1 and the semiconductor layer SC in the conventional manufacturing method of the TFT substrate 101, the detailed explanation of the step is omitted.

Next, the video signal lines DL (including the drain electrodes SD1) and the source electrodes SD2 are formed (step 403). Since step 403 adopts the processing substantially equal to the processing in a step of forming the video signal lines DL and the source electrodes SD2 in the conventional manufacturing method of the TFT substrate 101, the detailed explanation of the step is omitted.

Next, positions and line widths of the video signal lines DL formed on the insulating substrate SUB in step 403 are measured (step 404). In step 404, for example, as shown in FIG. 5B, positions and widths in the x direction (sizes in the x direction) of center lines M of the respective video signal lines DL ($DL_m$, $DL_{m+1}$) are measured. Further, based on a result of the measurement, the position XDLL in the x direction of the side DLSL of the video signal line $DL_m$ and the position XDLR in the x direction of the side DLSR of the video signal line $DL_{m+1}$ in each pixel are obtained.

Next, the second insulation layer PAS2 is formed (step 405). Since step 405 adopts the processing substantially equal to processing in a step of forming the second insulation layer PAS2 in the conventional manufacturing method of the TFT substrate 101, the detailed explanation of the step is omitted.

Next, based on the result of the measurement in step 404, size data of the pixel electrodes PX is edited and updated (step 406). In step 406, for example, first of all, an absolute value of difference (gap) DPGL' between the position XPXL of the side PXSL of the pixel electrode PX in the x direction in size data at the time of designing and the position XDLL of the side DLSL of the video signal line $DL_m$ in the x direction obtained in step 404 is compared with a gap DPGL in size data used at the time of designing. Then, when the absolute value of the difference between two gaps DPGL', DPGL is larger than a predetermined first value or smaller than a predetermined second value (a value smaller than the first value), the position XPXL of the side PXSL of the pixel electrode PX in the x direction in the size data at the time of designing is edited (corrected).

Further, in step 406, in the same manner, an absolute value of difference (gap) DPGR' between the position XPXR of the side PXSR of the pixel electrode PX in the x direction in size data at the time of designing and the position XDLR of the side DLSR of the video signal line $DL_{m+1}$ in the x direction obtained in step 404 is compared with a gap DPGR in size data used at the time of designing. Then, when the absolute value of the difference between two gaps DPGR', DPGR is larger than a predetermined first value or smaller than a predetermined second value (a value smaller than the first value), the position XPXR of the side XPXR of the pixel electrode PX in the x direction in the size data at the time of designing is edited (corrected).

Further, in the manufacturing method of the TFT substrate 101 according to this embodiment, the size data of the pixel electrode PX is preferably defined using parameters shown in FIG. 5C, for example. That is, one pixel electrode PX is expressed by the combination of a rectangular first region PXa and a trapezoidal second region PXb. Here, sizes and positions of the first region PXa are, for example, expressed by four numerical values consisting of xy coordinates (xa, ya) of a left upper apex, a size PLxa in the x direction, and a size PLya in the y direction. Further, sizes and positions of the second region PXb are, for example, expressed by six numerical values consisting of xy coordinates (xb1, yb1) of a left upper apex, xy coordinates (xb2, yb2) of a left lower apex, a size PLxb1 of an upper bottom in the x direction, and a size PLxb2 of a lower bottom in the x direction. Accordingly, in editing (correcting) the positions of the sides PXSL, PXSR of the pixel electrode PX in the x direction, a value of the x coordinates (xa) of the left upper apex and a value of the size PLxa in the x direction in the first region PXa, and the size PLxb1 of the upper bottom in the x direction and the size PLxb2 of the lower bottom in the x direction in the second region PXb may be corrected.

When the size data of the pixel electrode PX is edited and updated in step 406, subsequently, a third conductive film (for example, an ITO film) for forming pixel electrodes is formed (step 407). Since step 407 adopts the processing substantially equal to the processing in a step of forming the third conductive film (ITO film) in the conventional manufacturing method of the TFT substrate 101, the detailed explanation of the step is omitted.

Next, a photosensitive resist is applied to the third conductive film by coating (step 408). Since step 408 adopts the processing substantially equal to the processing in a step of applying the photosensitive resist to the third conductive film by coating in the conventional manufacturing method of the TFT substrate 101, the detailed explanation of the step is omitted.

Next, based on the size data of the pixel electrode PX updated in step 406, the photosensitive resist is exposed and, thereafter, is developed thus forming an etching resist (step 409). In step 409, the exposure of the photosensitive resist is performed using an exposure machine referred to as a direct drawing exposure machine, for example. The direct drawing exposure machine is an exposure device which, for example, divides an exposure region of the photosensitive resist into a large number of micro regions, determines whether or not each micro region is to be exposed based on size data (numerical value data) prepared by a CAD or the like, and sequentially or collectively exposes the micro regions which are determined to be exposed. Here, the direct drawing exposure machine uses the size data of the pixel electrodes PX updated in step 406.

With the use of the direct drawing exposure machine, an exposure pattern (exposure region) can be changed by merely changing the numerical values of the size data in use. Accordingly, even when the positions and the widths of the video signal lines DL differ for the respective pixels which constitute a display region of every TFT substrate or a sheet of TFT substrate 101, the direct drawing exposure machine can quickly and flexibly cope with such differences in positions and widths of the video signal lines DL. Further, when the direct drawing exposure machine is used, an exposure mask used in a conventional exposure device in general becomes unnecessary and hence, a manufacturing cost can be reduced.

Here, the photosensitive resist used for forming the etching resist in step 408 and step 409 may be either a negative resist or a positive resist. Further, with respect to the combination of a light source, a developer and the like used in exposure, any one of various combinations used in the conventional manufacturing method of the TFT substrate 101 may be used.

Next, using the etching resist formed in step 409 as a mask, the third conductive film is etched to form the pixel electrodes PX and, thereafter, the etching resist on the pixel electrodes PX is removed (peeled off) (step 410). Since step 410 adopts the processing equal to the processing in the step of etching the third conductive film (ITO film) and the step of removing the etching resist in the conventional manufacturing method of the TFT substrate 101 and hence, the detailed explanation of the step is omitted.

Figure 6A:
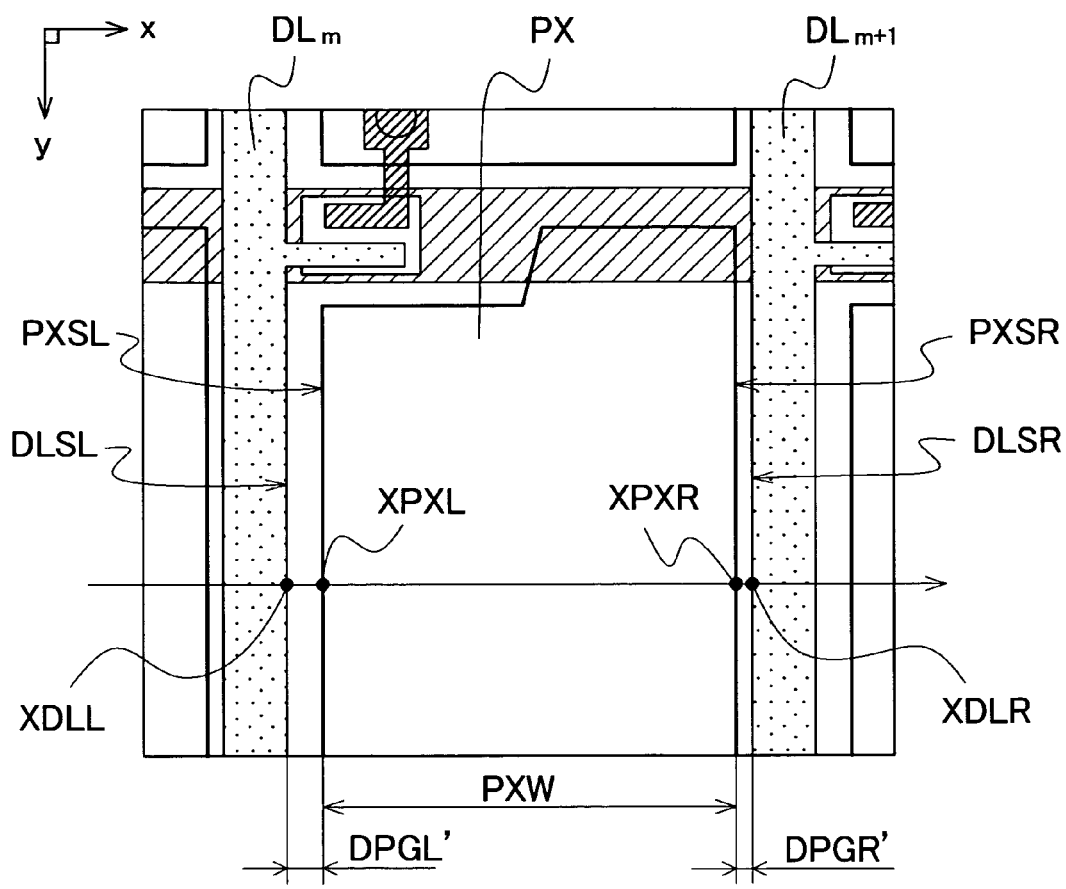
FIG. 6A is a schematic plan view showing one example of the relationship between a position of the video signal line formed on an insulating substrate and a position of the pixel electrode based on the size data.
Figure 6B:
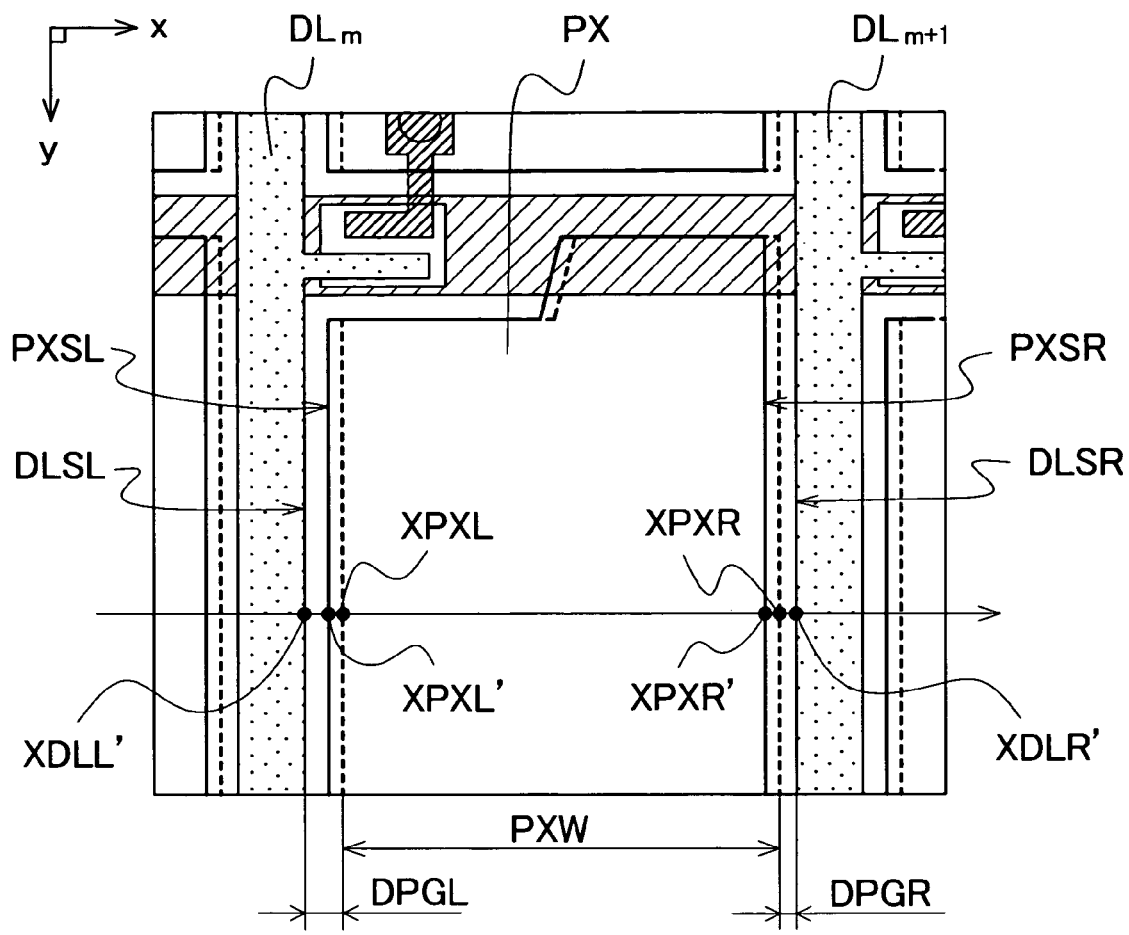
FIG. 6B is a schematic plan view showing one example of a correcting method of the size data of the pixel electrode when the pixel electrode assumes the positional relationship shown in FIG. 6A.

FIG. 6A and FIG. 6B are schematic plan views showing one example of an editing method of the size data of the pixel electrode in the manufacturing method of a TFT substrate of this embodiment.

FIG. 6A is a schematic plan view showing one example of the relationship between the positions of the video signal lines formed on the insulating substrate and the positions of the pixel electrodes based on the size data. FIG. 6B is a schematic plan view showing one example of a correcting method of the size data of the pixel electrodes when the pixel electrodes assume the positional relationship shown in FIG. 6A.

In the manufacturing method of the TFT substrate of this embodiment, in step (step 403) for forming the video signal lines DL and the like, the etching resist is formed on the second conductive film used for forming the video signal lines DL or the like and, thereafter, the second conductive film is etched using the etching resist as a mask. In forming the etching resist, in general, the photosensitive resist is applied to by coating or printed on the whole second conductive film and, thereafter, the exposure and the development are performed to form the etching resist. Here, the exposure of the photosensitive resist is conventionally often performed using an exposure mask which forms an exposure pattern constituted of a light blocking film made of chromium or the like on a surface of a substrate having high optical transmissivity such as a glass substrate. Accordingly, for example, in the step of exposing the photosensitive resist applied to by coating or printed on the second conductive film, a position of the insulating substrate SUB and a position of the exposure mask are displaced from each other and hence, positions where the video signal lines DL are formed may be displaced from positions designated based on the size data.

That is, in step 404, in measuring the positions and the line widths of the video signal lines DL formed on the insulating substrate SUB, for example, as shown in FIG. 6A, there may be a case that the position of the side DLSL of the video signal line $DL_m$ in the x direction assumes XDLL' (<XDLL), and the position of the side DLSR of the video signal line $DL_{m+1}$ in the x direction assumes XDLR' (<XDLR).

Here, when the pixel electrode PX is made to overlap the position based on the size data at the time of designing on the insulating substrate SUB, for example, the gap between the pixel electrode PX and the video signal line $DL_m$ assumes DPGL' (>DPGL), and the gap between the pixel electrode PX and the video signal line $DL_{m+1}$ assumes DPGR' (<DPGR). As a result, a capacitive value of a line capacitance $Cds_R$ becomes larger than a capacitive value of a line capacitance $Cds_L$ leading to the generation of longitudinal smear attributed to the fluctuation of a potential of the pixel electrode PX.

In such a case, the manufacturing method of a TFT substrate 101 of this embodiment performs processing in step 406. For example, as shown in FIG. 6B, the size data of the pixel electrode PX is edited and updated such that the position of the side PXSL of the pixel electrode PX in the x direction assumes XPXL' and the position of the side PXSR of the pixel electrode PX in the x direction assumes XPXR' while maintaining the width PXW of the pixel electrode PX. Here, the position XPXL' of the side PXSL of the pixel electrode PX in the x direction is corrected such that the gap between the pixel electrode PX and the video signal line $DL_m$ assumes the value DPGL, while the position XPXR' of the side PXSR of the pixel electrode PX in the x direction is corrected such that the gap between the pixel electrode PX and the video signal line $DL_{m+1}$ assumes the value DPGR. By forming the etching resist on the third conductive film and by forming the pixel electrode PX based on the size data corrected (edited) and updated in the above-mentioned manner, the value of the parasitic capacitance $Cds_L$ formed between the pixel electrode PX and the video signal line $DL_m$ and the value of the parasitic capacitance $Cds_R$ formed between the pixel electrode PX and the video signal line $DL_{m+1}$ assume the substantially same value and hence, the longitudinal smear attributed to the fluctuation of the potential of the pixel electrode PX can be suppressed.

Here, in the example shown in FIG. 6A and FIG. 6B, the explanation is made with respect to a case in which the positions of the video signal lines DL ($DL_m$, $DL_{m+1}$) formed on the insulating substrate SUB in the x direction are displaced from each other in the −x direction with respect to the x direction in the size data. However, as an opposite case, the positions of the video signal lines DL ($DL_m$, $DL_{m+1}$) may be displaced in the +x-direction. In such a case, the size data of the pixel electrode PX may be, as a matter of course, corrected such that positions of the sides PXSL, PXSR in the x direction are displaced in the +x direction while maintaining the width PXW, for example.

Further, in actually forming the TFT substrate 101, for example, there may be a case in which a positional displacement quantity of the video signal line $DL_m$ and the positional displacement quantity of the video signal line $DL_{m+1}$ differ from each other and hence, the gap between the video signal line $DL_m$ and the video signal line $DL_{m+1}$ becomes larger or smaller than value designated in the size data. In such a case, for example, the width PXW of the pixel electrode PX may be increased or decreased so as to make the gap between the pixel electrode PX and the video signal line $DL_m$ and the gap between the pixel electrode PX and the video signal line $DL_{m+1}$ assume the substantially same value and, at the same time, to make the above-mentioned two gaps have values equal to or larger than predetermined values (for example, values designated in the size data).

FIG. 7A to FIG. 7D are schematic plan views showing another example of the editing method of the size data of the pixel electrodes in the manufacturing method of the TFT substrate in this embodiment.

Figure 7A:
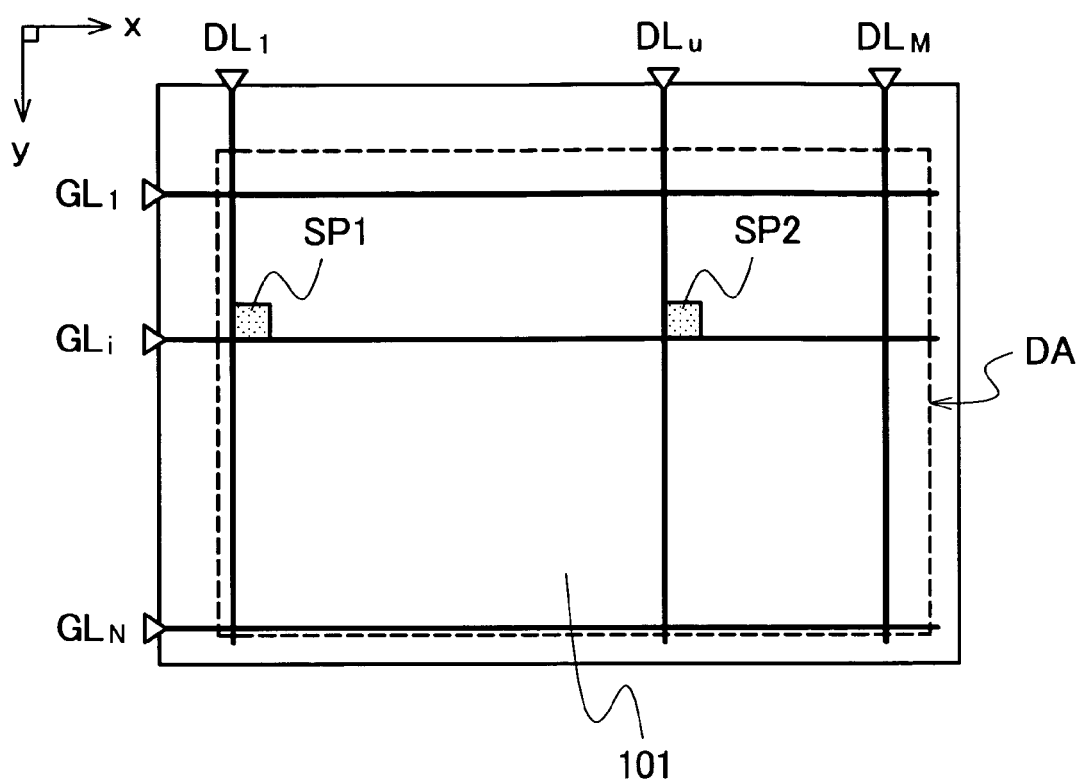
FIG. 7A is a schematic plan view showing an example of selection of two pixels formed in one display region of the TFT substrate.
Figure 7B:
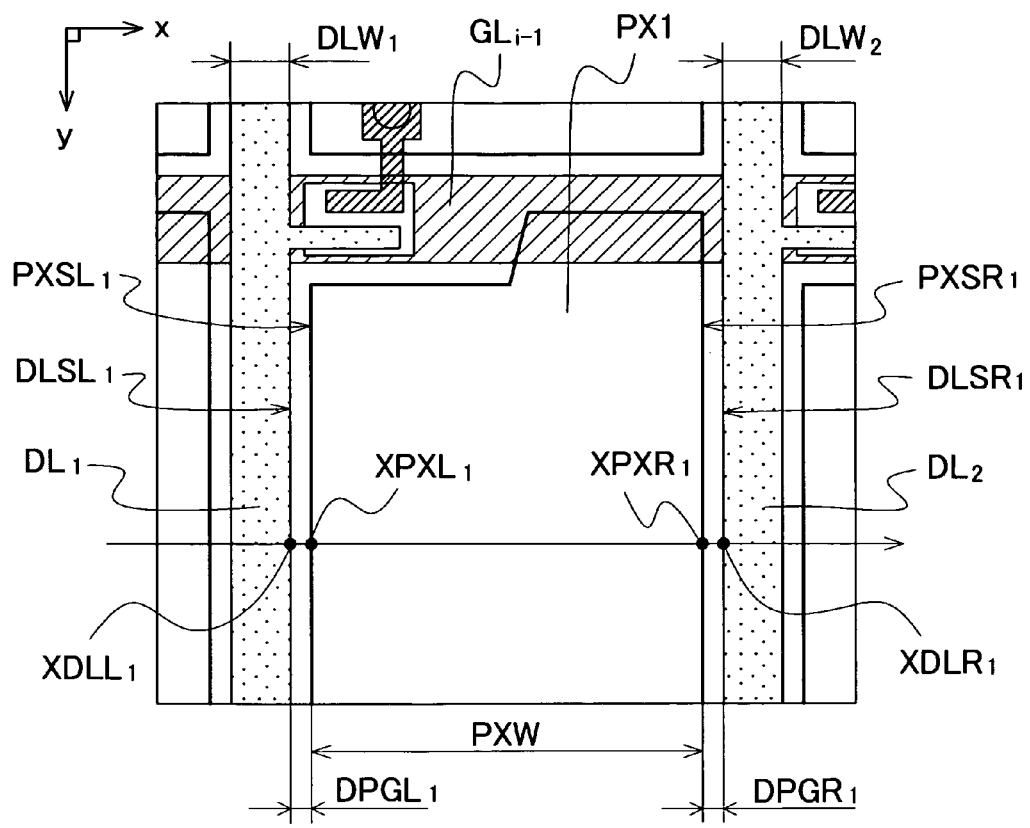
FIG. 7B is a schematic plan view showing one example of the relationship between a position of the video signal line formed on an insulating substrate in a pixel SP1 shown in FIG. 7A and a position of the pixel electrode based on the size data.
Figure 7C:
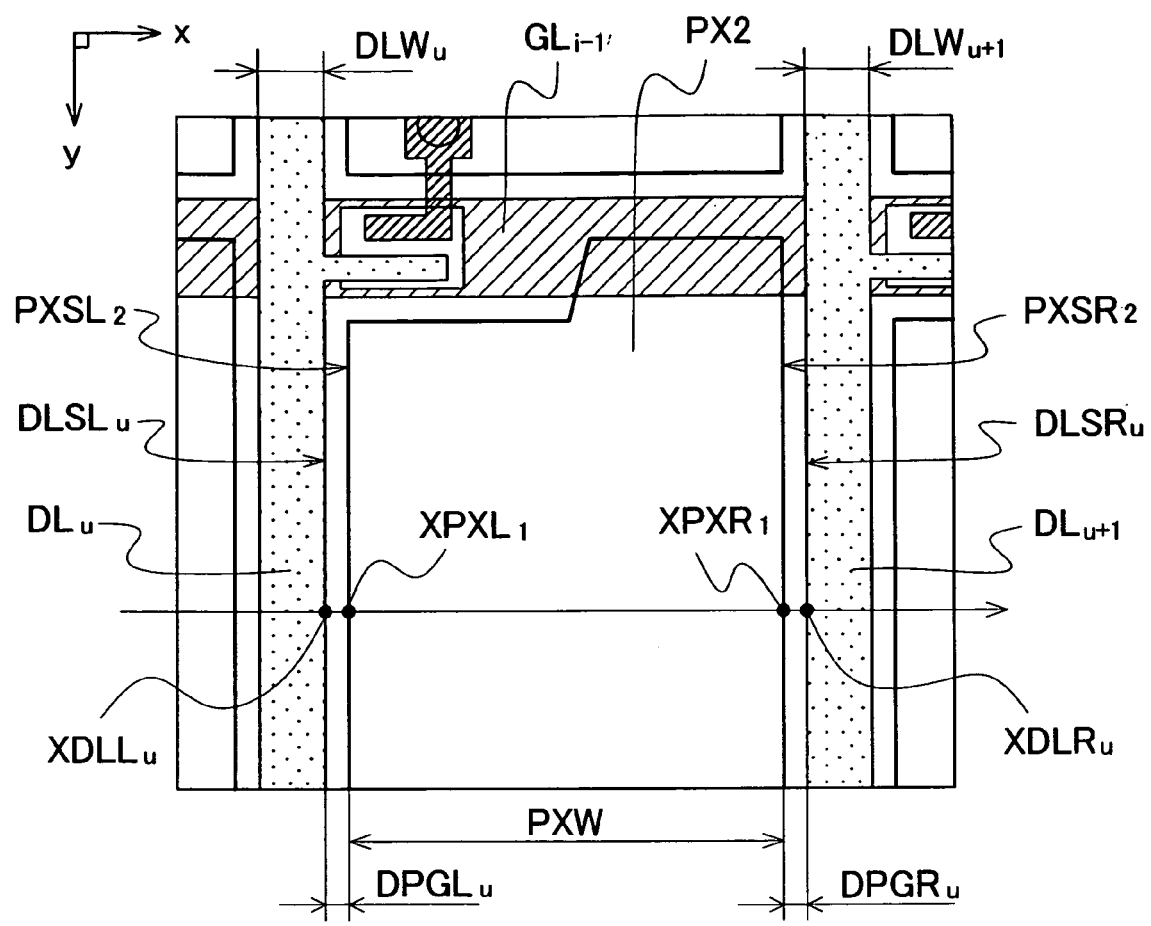
FIG. 7C is a schematic plan view showing one example of the relationship between a position of the video signal line formed on an insulating substrate in a pixel SP2 shown in FIG. 7A and a position of the pixel electrode based on the size data.
Figure 7D:
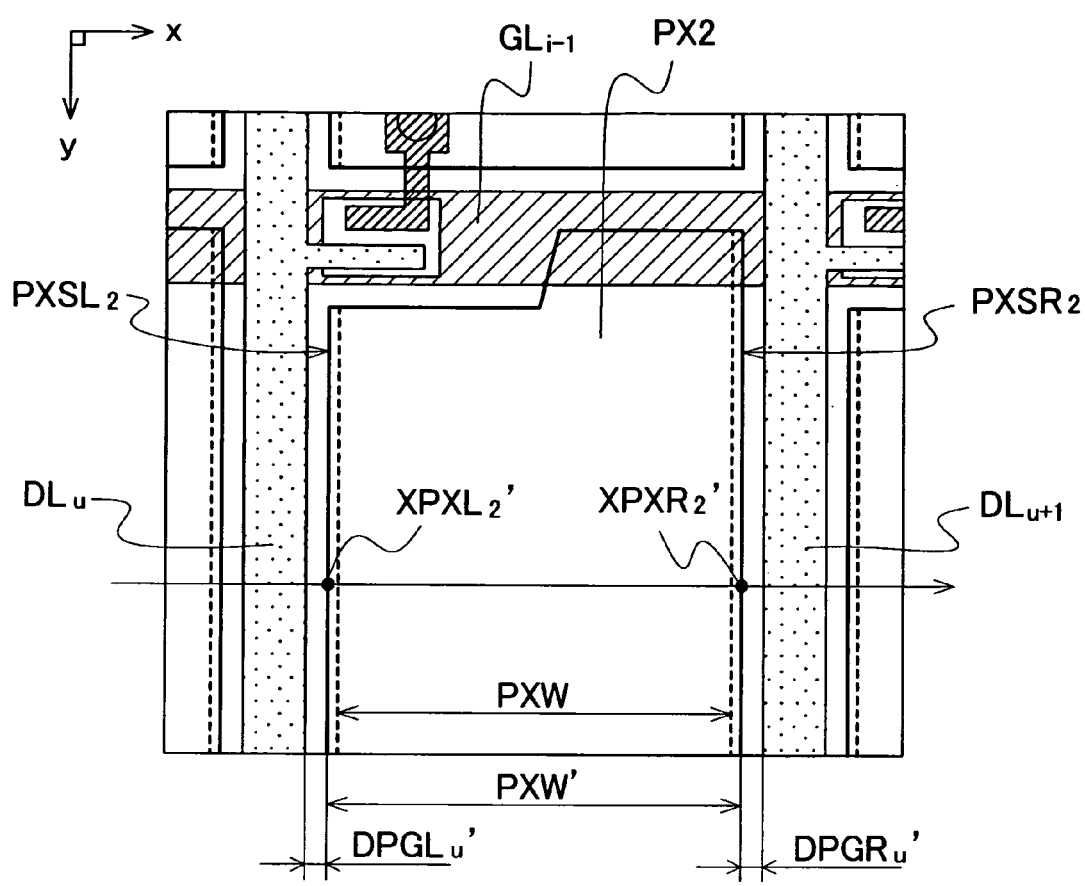
FIG. 7D is a schematic plan view showing one example of a correcting method of a size data of a pixel electrode in a pixel SP2.

FIG. 7A is a schematic plan view showing an example of selection of two pixels formed in one display region of the TFT substrate. FIG. 7B is a schematic plan view showing one example of the relationship between a position of the video signal line formed on an insulating substrate in a pixel SP1 and a position of the pixel electrode based on the size data shown in FIG. 7A. FIG. 7C is a schematic plan view showing one example of the relationship between a position of the video signal line formed on an insulating substrate in a pixel SP2 and a position of the pixel electrode based on the size data shown in FIG. 7A. FIG. 7D is a schematic plan view showing one example of a correcting method of size data of a pixel electrode in a pixel SP2.

In the manufacturing method of the TFT substrate 101 of this embodiment, in the step (step 403) for forming the video signal lines DL and the like, the video signal lines DL and the like are formed by etching the second conductive film. Accordingly, with respect to the plurality of video signal lines DL formed on the insulating substrate SUB, for example, when the widths of the respective video signal lines DL are compared with each other or when widths of respective portions of one video signal line DL are compared with each other, these widths may differ from each other. One example of such difference of the widths of the video signal lines DL is explained by taking two pixels SP1, SP2 shown in FIG. 7A as an example. The pixel SP1 shown in FIG. 7A is a pixel having a pixel electrode PX1 in a region surrounded by two neighboring scanning signal lines $GL_{i-1}$, $GL_i$ and two neighboring video signal lines $DL_1$, $DL_2$. Further, the pixel SP2 shown in FIG. 7A is a pixel having a pixel electrode PX2 in a region surrounded by two neighboring scanning signal lines $GL_{i-1}$, $GL_i$ and two neighboring video signal lines $DL_u$, $DL_{u+1}$.

In step 404, in measuring positions and line widths of two neighboring video signal lines $DL_1$, $DL_2$ with the pixel electrode PX1 which the pixel SP1 has sandwiched therebetween, for example, as shown in FIG. 7B, assume a width of the video signal line $DL_1$ as $DLW_1$, and a width of the video signal line $DL_2$ as $DLW_2$. Further, assume a position of the side $DLSL_1$ of the video signal line $DL_1$ in the x direction as $XDLL_1$ and a position of the side $DLSR_1$ of the video signal line $DL_2$ in the x direction as $XDLR_1$.

Here, to make the pixel electrode PX1 overlap a position based on the size data at the time of designing on the insulating substrate SUB, for example, a gap ($XPXL_1$−$XDLL_1$) between the pixel electrode PX1 and the video signal line $DL_m$ assumes $DPGL_1$, and a gap ($XDLR_1$−$XPXR_1$) between the pixel electrode PX1 and the video signal line $DL_{m+1}$ assumes $DPGR_1$.

Further, in measuring positions and line widths of two neighboring video signal lines $DL_u$, $DL_{u+1}$ with the pixel electrode PX2 which the pixel SP2 has sandwiched therebetween, for example, as shown in FIG. 7C, assume a width of the video signal line $DL_u$ as $DLW_u$, and a width of the video signal line $DL_{u+1}$ as $DLW_{u+1}$. Further, assume a position of the side $DLSL_u$ of the video signal line $DL_u$ in the x direction as $XDLL_u$ and a position of the side $DLSR_u$ of the video signal line $DL_{u+1}$ in the x direction as $XDLR_u$.

Here, to make the pixel electrode PX2 overlap a position based on the size data at the time of designing on the insulating substrate SUB, for example, a gap ($XPXL_2$−$XDLL_u$) between the pixel electrode PX2 and the video signal line $DL_u$ assumes $DPGL_u$, and a gap ($XDLR_u$−$XPXR_2$) between the pixel electrode PX2 and the video signal line $DL_{u+1}$ assumes $DPGR_u$.

Here, as shown in FIG. 7B and FIG. 7C, when the widths $DLW_u$, $DLW_{u+1}$ of the video signal lines $DL_u$, $DL_{u+1}$, are smaller than the widths $DLW_1$, $DLW_2$ of the video signal lines $DL_1$, $DL_2$, between the gap $DPGL_1$ defined between the pixel electrode PX1 and the video signal line $DL_1$ and the gap $DPGL_u$ defined between the pixel electrode PX2 and the video signal line $DL_u$, the relationship of $DPGL_1 < DPGL_u$ is established. In the same manner, between the gap $DPGR_1$ defined between the pixel electrode PX1 and the video signal line $DL_2$ and the gap $DPGR_u$ defined between the pixel electrode PX2 and the video signal line $DL_{u+1}$, the relationship of $DPGR_1 < DPGR_u$ is established.

Accordingly, values of two parasitic capacitances $Cds_L$ and $Cds_R$ in the pixel SP1 assume the substantially same value, and values of two parasitic capacitances $Cds_L$ and $Cds_R$ in the pixel SP2 assume the substantially same value. However, the value of the parasitic capacitance $Cds_L$ in the pixel SP1 and the value of the parasitic capacitance $Cds_L$ in the pixel SP2 become different from each other.

In such a case, in the manufacturing method of the TFT substrate 101 of this embodiment, processing in step 406 is performed. For example, as shown in FIG. 7D, the width of the pixel electrode PX2 of the pixel SP2 is increased to PXW' so as to edit and update the size data of the pixel electrode PX2 such that the position of the side $PXSL_2$ of the pixel electrode PX2 in the x direction assumes $XPXL_2'$ and the position of the side $PXSR_2$ of the pixel electrode PX2 in the x direction assumes $XPXR_2'$. Here, the position $XPXL_2'$ of the side $PXSL_2$ of the pixel electrode PX2 in the x direction is corrected such that the gap between the pixel electrode PX2 and the video signal line $DL_u$ assumes the value $DPGL_1$, for example, while the position $XPXR_2'$ of the side $PXSR_2$ of the pixel electrode PX2 in the x direction is corrected such that the gap between the pixel electrode PX2 and the video signal line $DL_{u+1}$ assumes the value $DPGR_1$. By forming the etching resist on the third conductive film and by forming the pixel electrodes PX based on the size data corrected (edited) and updated in the above-mentioned manner, the value of the parasitic capacitance $Cds_L$ formed between the pixel electrode PX1 and the video signal line $DL_1$ and the value of the parasitic capacitance $Cds_L$ formed between the pixel electrode PX2 and the video signal line $DL_u$ assume the substantially same value. In the same manner, the value of the parasitic capacitance $Cds_R$ formed between the pixel electrode PX1 and the video signal line $DL_2$ and the value of the parasitic capacitance $Cds_R$ formed between the pixel electrode PX2 and the video signal line $DL_{u+1}$ assume the substantially same value.

Here, in actually forming the TFT substrate 101, the editing (correction) and the updating of the respective pixel electrodes PX are not limited to two pixels SP1, SP2 shown in FIG. 7A. That is, the size data of the respective pixel electrodes PX is edited (corrected) and updated such that when two arbitrary pixels are selected out of a large number of pixels in the display region DA are selected, the value of the parasitic capacitance $Cds_L$ in one pixel and the value of the parasitic capacitance $Cds_L$ in another pixel assume the substantially same value, the value of the parasitic capacitance $Cds_R$ in one pixel and the value of the parasitic capacitance $Cds_R$ in another pixel assume the substantially same value, and two parasitic capacitances $Cds_L$, $Cds_R$ in one pixel assume the substantially same value.

FIG. 8A to FIG. 8D are schematic views for explaining one example of a measuring method of positions of the video signal lines in the manufacturing method of a TFT substrate of this embodiment.

Figure 8A:
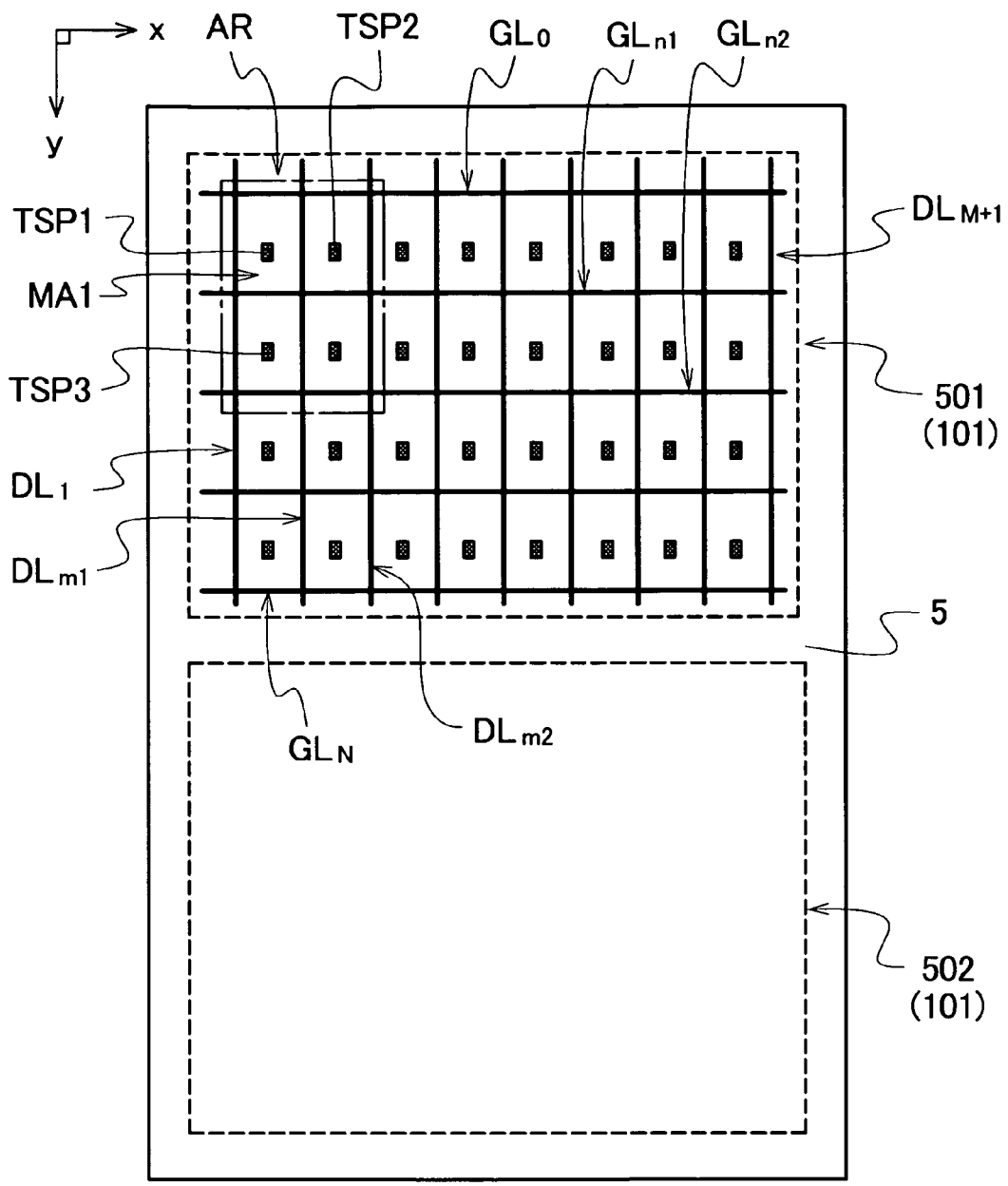
FIG. 8A is a schematic plan view showing one example of a measuring method of a position of the video signal line.
Figure 8B:
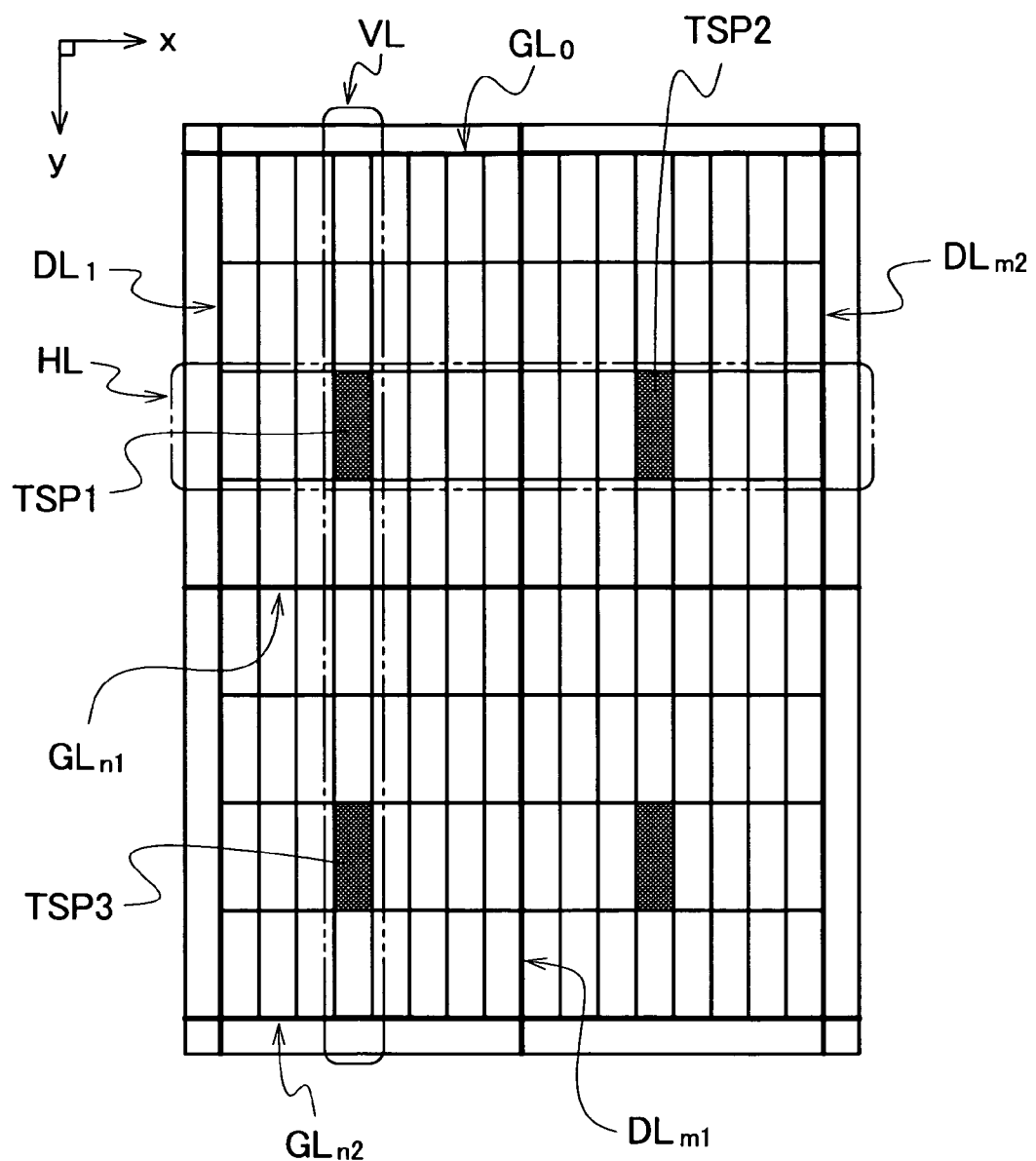
FIG. 8B is a schematic plan view showing a region AR in FIG. 8A in an enlarged manner.
Figure 8C:
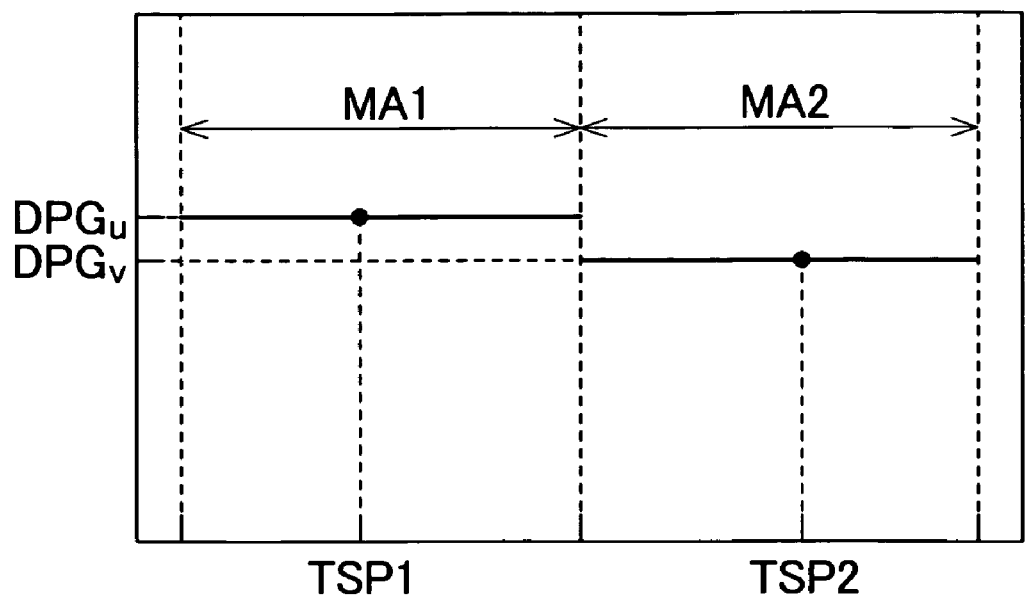
FIG. 8C is a schematic graph for explaining an estimating method of a position of the video signal lines in respective pixels arranged in parallel to each other on a horizontal line HL in FIG. 8B.
Figure 8D:
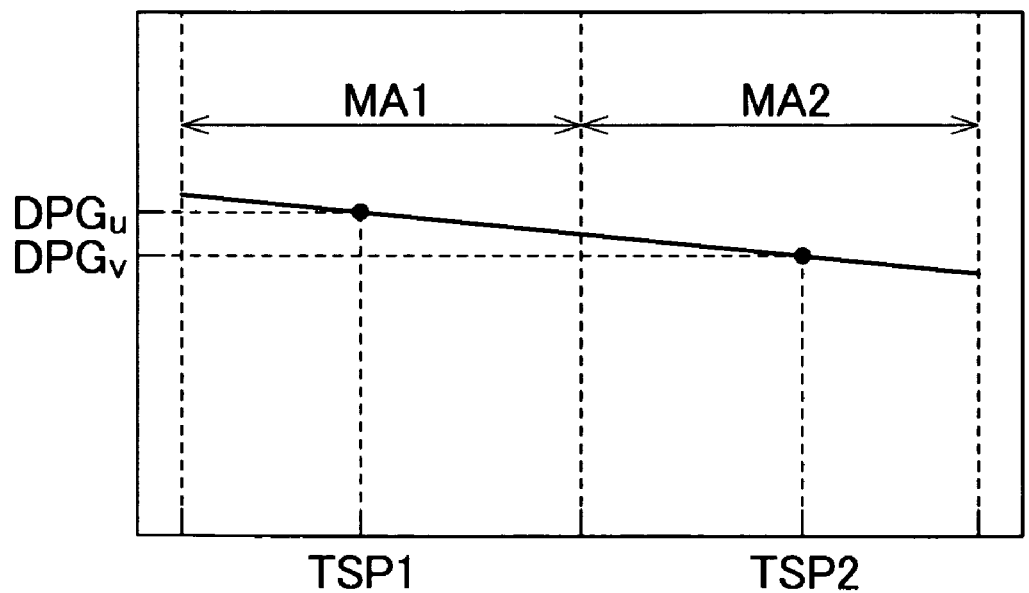
FIG. 8D is a schematic graph for explaining an estimating method of a position of the video signal lines in the respective pixels arranged in parallel to each other on a vertical line VL in FIG. 8B.

FIG. 8A is a schematic plan view showing one example of a measuring method of a position of the video signal line. FIG. 8B is a schematic plan view showing a region AR in FIG. 8A in an enlarged manner. FIG. 8C is a schematic graph for explaining an estimating method of a position of the video signal line in each pixel arranged along a horizontal line HL in FIG. 8B. FIG. 8D is a schematic graph for explaining an estimating method of a position of the video signal line in each pixel arranged along a vertical line VL in FIG. 8B.

In the manufacturing method of the TFT substrate 101 in this embodiment, it is desirable to perform the step (step 404) for measuring the positions and the line widths of the video signal lines DL, for example, in all pixel regions constituting one display region DA.

However, in a case that the TFT substrate 101 is a TFT substrate which is used for a liquid crystal display device having a large screen and high resolution such as a liquid crystal television receiver set, for example, when the positions and the line widths of the video signal lines DL of all pixel regions are measured, a measuring time is extremely prolonged and hence, the manufacturing efficiency of the TFT substrate 101 becomes extremely deteriorated.

Accordingly, step (step 404) for measuring the positions and the line widths of the video signal lines DL may be performed such that, for example, one display region DA is divided into small regions smaller than the pixel regions constituting the display region DA in number and a representative point (pixel region) is determined for every small region and, thereafter, the position and the line width of the video signal line DL at each representative point may be measured. Here, the position and the line width of the video signal line DL in each pixel region which constitutes one small region are estimated from the positions and the line widths of the video signal lines DL at the representative point, for example.

In manufacturing the TFT substrate 101 used for the liquid crystal television receiver set or the like, for example, as shown in FIG. 8A, the TFT substrate 101 is formed in two regions 501, 502 of one sheet of mother glass (glass substrate) 5 having a large area and, thereafter, two regions 501, 502 are cut thus obtaining two TFT substrates 101.

Here, for example, the display region DA of the TFT substrate 101 formed in one region 501 of the mother glass 5 corresponds to a region surrounded by two scanning signal lines $GL_0$, $GL_N$ and two video signal lines $DL_1$, $DL_{m+1}$. Here, between two scanning signal lines $GL_0$, $GL_N$, N−1 pieces of scanning signal lines including scanning signal lines $GL_{n1}$, $GL_{n2}$ are formed. Further, between two video signal lines $DL_1$, $DL_{M+1}$, M−1 pieces of video signal lines including video signal lines $DL_{m1}$, $DL_{m2}$ are formed.

Here, the display region DA is also constituted of a mass of several hundreds of thousands to several millions of pixel regions. Accordingly, it is extremely inefficient to measure the positions and the line widths of the video signal lines DL in all pixel regions.

Accordingly, in the example shown in FIG. 8A, for example, the display region DA is divided into 32 pieces of small regions (a matrix of 8 pieces in the lateral direction and 4 pieces in the longitudinal direction) and positions and line widths of the video signal lines DL at representative points TSP in the respective small regions are measured. Positions and line widths of the video signal lines DL in a plurality of pixel regions constituting one small region are estimated based on, for example, the positions and the line widths of the video signal lines DL at the representative points TSP in the small regions and positions and line widths of the video signal lines DL at representative points TSP in small regions arranged close to the small region.

A manner of estimating the positions and the line widths of the video signal lines DL in the plurality of pixel regions constituting one small region is briefly explained by taking the small region positioned at a left upper corner portion of the display region DA, that is, a small region MA1 surrounded by two scanning signal lines $GL_0$, $GL_{n1}$ and two video signal lines $DL_1$, $DL_{m1}$ as an example.

To enlarge the region AR shown in FIG. 8A, that is, the small region MA1 positioned at the left upper corner portion of the display region DA and the small regions neighboring to the small region MA1, for example, as shown in FIG. 8B, each small region is constituted of a mass of a plurality of pixel regions. Here, positions and line widths of the video signal lines DL in the respective pixel regions constituting the small region MA1 are estimated based on, for example, the positions and the line widths of the video signal lines DL at the representative point TSP1 in the small region MA1, the positions and the line widths of the video signal lines DL at the representative point TSP2 in the small region MA2 arranged on a right side of and close to the small region MA1, and the positions and the line widths of the video signal lines DL at the representative point TSP3 in the small region MA3 arranged on a lower side of and close to the small region MA1.

First of all, the positions and the line widths of two neighboring video signal lines $DL_u$, $DL_{u+1}$ which sandwich the pixel electrode PX arranged at the representative point TSP1 in the small region MA1 are measured and, as a result of measurement, a gap between two video signal lines $DL_u$, $DL_{u+1}$ is assumed as $GDL_u$. Further, the positions and the line widths of two neighboring video signal lines $DL_v$, $DL_{v+1}$ which sandwich the pixel electrode PX arranged at the representative point TSP2 in the small region MA2 are measured and, as a result of measurement, a gap between two video signal lines $DL_v$, $DL_{v+1}$ is assumed as $GDL_v$.

Here, with respect to the respective pixels arranged in parallel to each other in the horizontal line HL shown in FIG. 8B, the gap defined between two neighboring video signal lines with the pixel electrode PX sandwiched therebetween is estimated based on a graph shown in FIG. 8C, for example. Here, in the graph shown in FIG. 8C, the respective pixels arranged on a horizontal line HL are taken on an axis of abscissas and a gap GDL defined between two neighboring video signal lines with the pixel electrode sandwiched therebetween is taken on an axis of ordinates.

That is, with respect to the pixels arranged in parallel to each other in the horizontal line HL, assume the gap between two video signal lines in each pixel belonging to the small region MA1 as the gap $GDL_u$ at the representative point TSP1, and the gap between two video signal lines in each pixel belonging to the small region MA2 as the gap $GDL_v$ at the representative point TSP2. Further, with respect to the pixels arranged in parallel to each other in the horizontal line HL, the positions and the line widths of the video signal lines in each pixel belonging to the small region MA1 are estimated based on the positions, the line widths and the gap $GDL_u$ of the video signal lines $DL_u$, $DL_{u+1}$ at the representative point TSP1. In the same manner, with respect to the pixels arranged in parallel to each other in the horizontal line HL, the positions and the line widths of the video signal lines in each pixel belonging to the small region MA2 are estimated based on the positions, the line widths and the gaps $GDL_v$ of the video signal lines $DL_v$, $DL_{v+1}$ at the representative point TSP2.

Here, also with respect to the gap between two video signal lines in the respective pixels arranged in parallel to each other on the vertical line VL shown in FIG. 8C, assume the gap between two video signal lines in each pixel belonging to the small region MA1 as the gap $GDL_u$ at the representative point TSP1. Then, with respect to the pixels arranged in parallel to each other in the vertical line VL, the positions and the line widths of the video signal lines in each pixel belonging to the small region MA1 are estimated based on the positions, the line widths and the gap $GDL_u$ of two video signal lines $DL_u$, $DL_{u+1}$ at the representative point TSP1.

Further, the positions and the line widths of the video signal lines in other pixels belonging to the small region MA1 are also estimated based on the positions, the line widths and the gap $GDL_u$ of the video signal lines $DL_u$, $DL_{u+1}$ at the representative point TSP1.

Here, in estimating the positions, the line widths and the gap of the video signal lines in the pixel other than the representative point belonging to each small region by the method shown in FIG. 8C, for example, the gap of the video signal lines in two neighboring pixels with a boundary between two neighboring small regions sandwiched therebetween is discontinuously changed. Accordingly, a change of image quality between two neighboring small regions at the boundary becomes conspicuous thus giving rise to possibility of the generation of image quality irregularities.

To prevent such a discontinuous change of the gap between the video signal lines in two neighboring pixels with the boundary of two neighboring small regions sandwiched therebetween, the gap may be estimated using a graph shown in FIG. 8D, for example. Here, in the graph shown in FIG. 8D, respective pixels which are arranged in parallel to each other on the horizontal line HL are taken on an axis of abscissas, and the gap GDL between two neighboring video signal lines with the pixel electrode sandwiched therebetween is taken on an axis of ordinates.

That is, the gap between two video signal lines in the each pixel arranged in parallel to each other on the horizontal line HL is assumed to be decreased monotonously along a straight line which passes the gap $GDL_u$ at the representative point TSP1 in the small region MA1 and the gap $GDL_v$ at the representative point TSP2 in the small region MA2. Then, in accordance with this straight line, with respect to the pixels arranged in parallel to each other on the horizontal line HL, the positions and the line widths of the video signal lines in the respective pixels belonging to the small region MA1 are estimated based on the positions and the line widths of the video signal lines $DL_u$, $DL_{u+1}$ at the representative point TSP1 and a straight line indicative of the change of the gap. In the same manner, out of the pixels arranged in parallel to each other on the horizontal line HL, the positions and the line widths of the video signal lines in the respective pixels belonging to the small region MA2 are estimated based on the positions and the line widths of the video signal lines $DL_v$, $DL_{v+1}$ at the representative point TSP2 and a straight line indicative of the change of the gap. Due to such estimations, the gap between video signal lines in two neighboring pixels with a boundary of two neighboring small regions sandwiched therebetween is continuously changed. Accordingly, the conspicuous change of image quality between two neighboring small regions at the boundary can be suppressed.

As described above, according to the manufacturing method of the TFT substrate 101 of this embodiment, for example, even when the positions where the video signal lines DL are formed are displaced from each other, the parasitic capacitance $Cds_L$ formed between the pixel electrode PX and the video signal line $DL_m$ and the parasitic capacitance $Cds_R$ formed between the pixel electrode PX and the video signal line $DL_{m+1}$ in one pixel assume the substantially same value. Further, even when the widths of the video signal lines DL have irregularities, the parasitic capacitance $Cds_L$ formed between the pixel electrode PX and the video signal line $DL_m$ and the parasitic capacitance $Cds_R$ formed between the pixel electrode PX and the video signal line $DL_{m+1}$ in each pixel assume the substantially same value. Accordingly, the occurrence of longitudinal smear can be suppressed.

Further, the parasitic capacitance $Cds_L$ formed between the pixel electrode PX and the video signal line $DL_m$ and the parasitic capacitance $Cds_R$ formed between the pixel electrode PX and the video signal line $DL_{m+1}$ in each pixel respectively assume values substantially equal to values based on size data at the time of designing. Accordingly, it is possible to suppress the power consumption of the video signal lines as well as the occurrence of longitudinal smear.

Further, in the manufacturing method of the TFT substrate 101 of this embodiment, the forming positions and the sizes of pixel electrodes PX are corrected based on the positions and the line widths of the video signal lines DL formed on the insulating substrate SUB and hence, it is unnecessary to increase a thickness of the second insulation layer PAS2 to an extent that the fluctuations of the parasitic capacitances $Cds_L$, $Cds_R$ can be ignored, for example. Further, the longitudinal smear can be suppressed even when a shielding electrode for suppressing the longitudinal smear may not be additionally provided. Accordingly, a manufacturing time of the TFT substrate 101 can be shortened and, at the same time, a manufacturing cost can be reduced.

Figure 9:
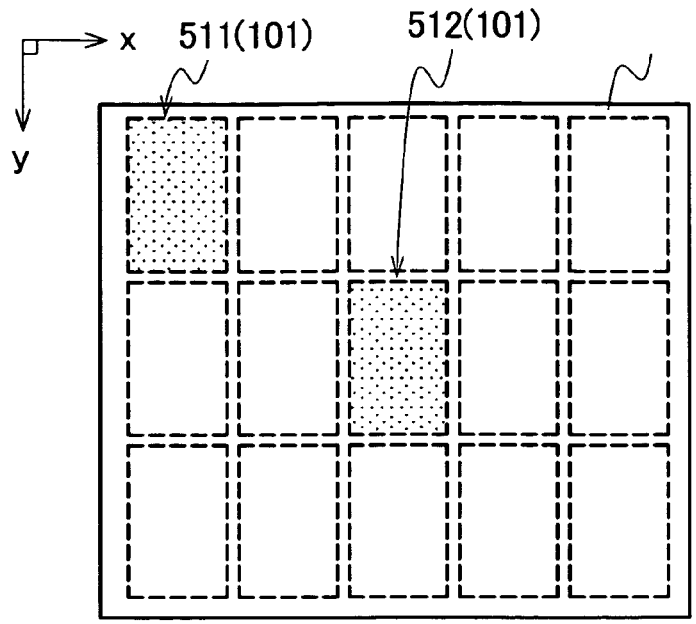
FIG. 9 is a schematic plan view for explaining another manner of operation and advantageous effects of the manufacturing method of the TFT substrate of this embodiment.

FIG. 9 is a schematic plan view for explaining another manner of operation and advantageous effects of the manufacturing method of the TFT substrate of this embodiment.

The manufacturing method of the TFT substrate 101 of this embodiment is not limited to the manufacture of the TFT substrate having a large area used in a liquid crystal television receiver set or the like and may be also applicable to the manufacture of the TFT substrate having a small area used in a display of a mobile phone terminal, for example.

In forming the TFT substrates 101 having a small area, the TFT substrate 101 are formed in ten-and-some to several-ten regions of one sheet of mother glass 5 and, thereafter, the respective regions are cut to form a large number of TFT substrates 101.

That is, in acquiring 15 pieces of TFT substrates 101 from one sheet of mother glass 5, for example, as shown in FIG. 9, the TFT substrates 101 are formed in the respective fifteen regions of one sheet of mother glass 5.

Here, the TFT substrate 101 formed in one region, for example, the TFT substrate 101 formed in the region 511 has a relatively narrow area, and a change (irregularities) of line widths of a plurality of video signal lines DL formed in the region 511 is relatively small.

However, for example, to compare a line width of the video signal line DL formed in the region 511 arranged close to a corner portion of the mother glass 5 and a line width of the video signal line DL formed in a region 512 including the center (the center of gravity) of the mother glass 5, there may be a case that the change (difference) in line width is large.

Accordingly, in the conventional manufacturing method, in forming the TFT substrate 101 in the respective regions of the mother glass 5 shown in FIG. 9, for example, there has been a case that image quality differs between a liquid crystal display (display device) using the TFT substrate 101 formed in the region 511 and a liquid crystal display using the TFT substrate 101 formed in the region 512.

To the contrary, with the use of the manufacturing method of the TFT substrate 101 of this embodiment, not to mention the suppression of longitudinal smear in the liquid crystal display using one sheet of TFT substrate 101 cut from the mother glass 5, it is also possible to make the liquid crystal display (display device) using the TFT substrate 101 formed in the region 511 and the liquid crystal display using the TFT substrate 101 formed in the region 512 have the substantially same image quality.

Figure 10A:
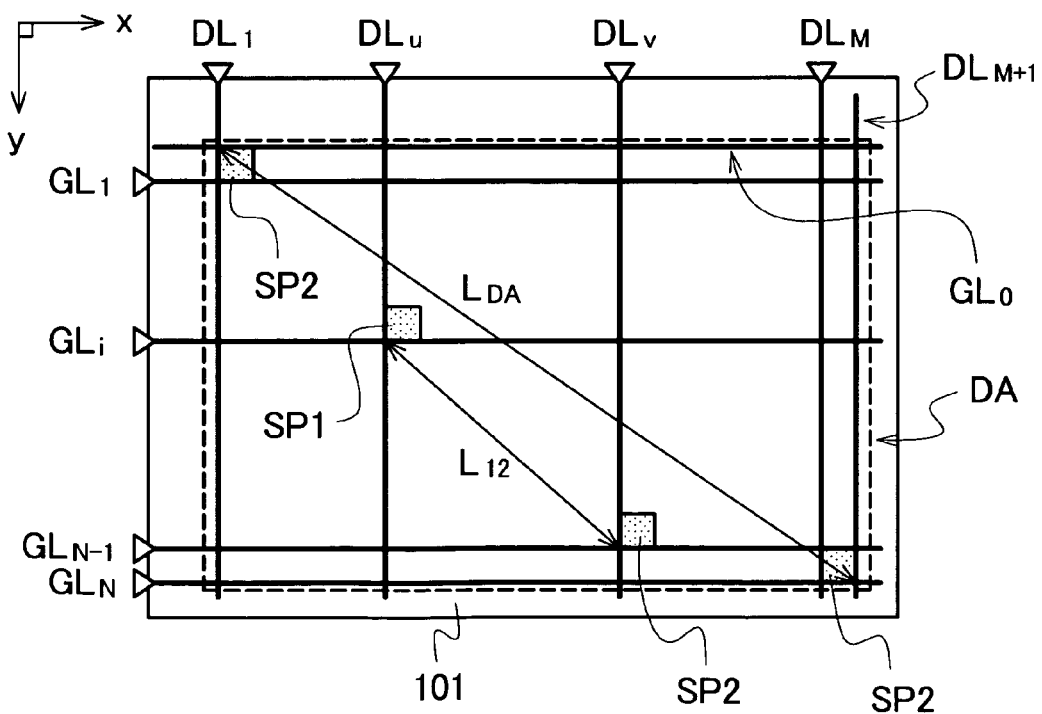
FIG. 10A is a schematic plan view for explaining an estimating method of irregularities in etching quantity in one sheet of TFT substrate.
Figure 10C:
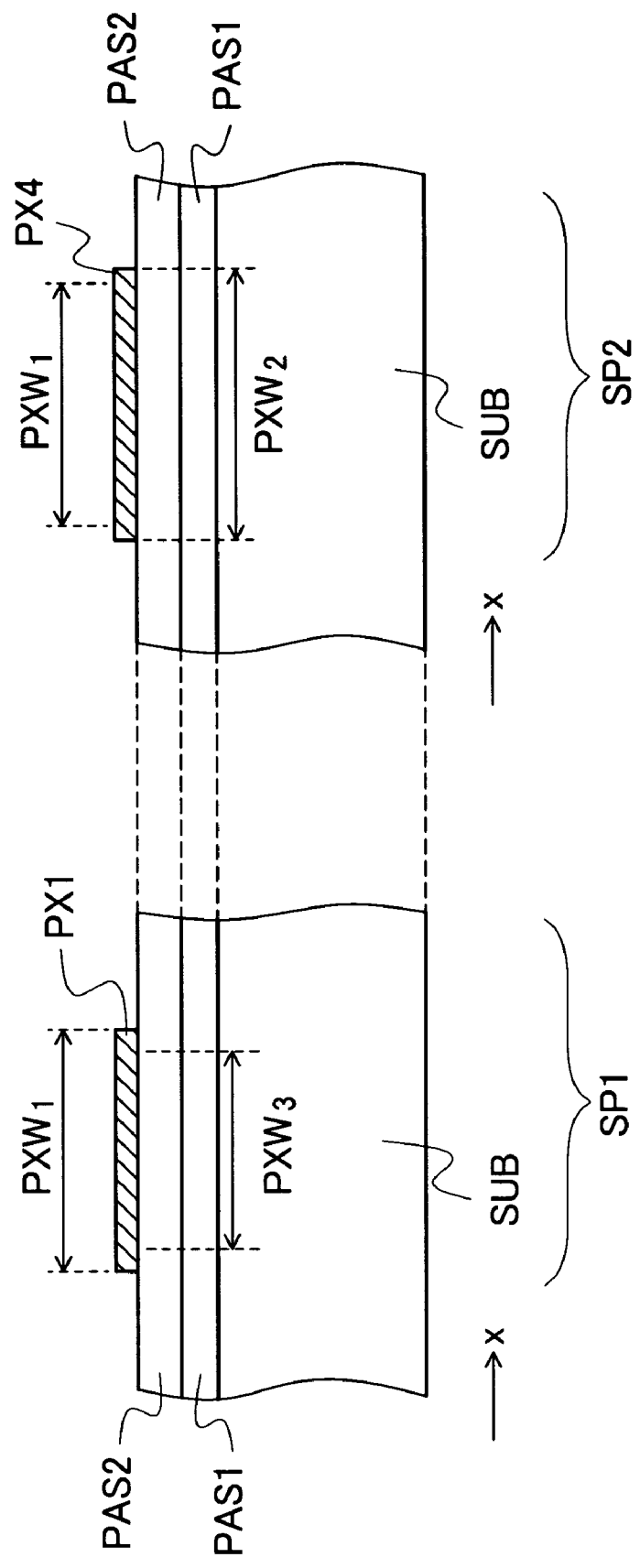
FIG. 10C is a schematic cross-sectional view showing one example of irregularities in etching quantity in two pixels SP1, SP2 shown in FIG. 10A.

FIG. 10A to FIG. 10C are schematic views for supplementing the constitution of the TFT substrate manufactured by the manufacturing method of this embodiment.

FIG. 10A is a schematic plan view for explaining an estimating method of irregularities in etching quantity in one sheet of TFT substrate. FIG. 10B is a schematic cross-sectional view showing one example of irregularities in etching quantity in two pixels SP3, SP4 diagonally positioned in the display region DA shown in FIG. 10A. FIG. 10C is a schematic cross-sectional view showing one example of irregularities in etching quantity in two pixels SP1, SP2 shown in FIG. 10A.

In the manufacturing method of the TFT substrate 101 of this embodiment, the pixel electrodes PX are formed by etching the third conductive film (for example, ITO film). Here, the etching resist formed on the third conductive film is formed by performing exposure and development based on the size data of the pixel electrodes PX whose forming positions and sizes are corrected using the above-mentioned method. However, in etching the third conductive film (ITO film), for example, there may be a case that irregularities arise in etching quantity among respective positions on the TFT substrate 101. Accordingly, the sizes of the actually formed pixel electrode PX may become larger or smaller than the sizes in the size data updated in step 406.

In examining a degree of irregularities in etching quantity on one sheet of TFT substrate 101 when the third conductive film (ITO film) is etched, inventors of the present invention, first of all, examine irregularities of sizes (widths PXW) of the pixel electrodes PX in two pixels SP3, SP4 positioned diagonally in the display region DA as shown in FIG. 10A, for example. Here, on a surface of the insulating substrate SUB formed of a glass substrate or the like, for example, a first insulation layer PAS1 and a second insulation layer PAS2 having uniform film thicknesses are formed, a conductive film (ITO film) having a uniform film thickness is formed on the second insulation layer PS2, and using an etching resist formed such that the widths PXW of the pixel electrodes PX in all pixels become uniform as a mask, for example, the third conductive film (ITO film) is etched.

As a result, for example, as shown in FIG. 10B, between the width $PXW_3$ of the pixel electrode PX3 in the pixel SP3 positioned at one corner portion of the display region DA and the width $PXW_4$ of the pixel electrode PX4 in the pixel SP4 positioned at another corner portion of the display region DA, the relationship of $PXW_4 > PXW_3$ is established. Further, according to an example examined by the inventors of the present invention, when the diagonal size $L_{DA}$ of the display region DA is 80 cm, the difference $(PXW_4 - PXW_3)$ between the width $PXW_3$ of the pixel electrode PX3 and the width $PXW_4$ of the pixel electrode PX4 is 2.6 µm.

Further, between the width $PXW_1$ of the pixel electrode PX1 in the pixel SP1 shown in FIG. 10A and the width $PXW_2$ of the pixel electrode PX2 in the pixel SP2 shown in FIG. 10A, the relationship shown in FIG. 10C is established, for example. Here, with respect to the width $PXW_1$ of the pixel electrode PX1, the relationship of $PXW_2 > PXW_1 > PXW_3$ is established, while with respect to the width $PX_2$ of the pixel electrode PX2, the relationship of $PXW_4 > PXW_2 > PXW_1$ is established. That is, the difference $(PXW_2 - PXW_1)$ between the width $PXW_1$ of the pixel electrode PX1 and the width $PXW_2$ of the pixel electrode PX2 is smaller than 2.6 µm.

From the above result, it is estimated that when the TFT substrate 101 whose diagonal size $L_{DA}$ of the display region DA is 80 cm is manufactured, due to the irregularities in etching quantity, a change of 2.6 µm at maximum occurs between the widths of two arbitrary pixel electrodes PX.

In this manner, in etching the conductive film (ITO film), when there exist irregularities in etching quantity at respective points on one sheet of TFT substrate 101, even when the pixel electrodes PX are formed using the size data updated based on the technical concept of this embodiment, the displacement of size attributed to irregularities in etching quantity arises.

Accordingly, in the manufacturing method of the TFT substrate 101 of this embodiment, by taking irregularities in etching quantity which arise in forming the pixel electrodes PX into consideration, for example, provided that the relationship between the gap DPGL defined between the pixel electrode PX and the video signal line $DL_m$ shown in FIG. 4 and the gap DPGR defined between the pixel electrode PX and the video signal line $DL_{m+1}$ satisfies the relationships expressed in following formulae 1 to 3, the gaps DPGL, DPGR in the respective pixels are assumed to be equal to the gaps based on the updated size data.

$$DPGL+\sigma/L_{DA}\cdot PXW > DPGR > DPGL-\sigma/L_{DA}\cdot PXW \quad \text{(formula 1)}$$

$$DPGL > DPG_{min}-\sigma/L_{DA}\cdot PXW \quad \text{(formula 2)}$$

$$DPGR > DPG_{min}-\sigma/L_{DA}\cdot PXW \quad \text{(formula 3)}$$

Here, in the above-mentioned formulae 1 to 3, symbol $\sigma$ indicates difference in etching quantity between two pixel electrodes spaced apart from each other by the distance $L_{DA}$. Further, in the above-mentioned formulae 2 and 3, symbol $DPG_{min}$ indicates a gap between the pixel electrode PX and the video signal line DL in a size data at the time of designing.

Further, when the degree of change of such etching quantity is known, for example, in updating the size data of the pixel electrodes PX in step 406 shown in FIG. 5A, for example, by performing such updating by also taking the change of etching quantity into consideration, the longitudinal smear suppression effect can be further enhanced.

Although the present invention has been specifically explained in conjunction with the embodiment, it is needless to say that the present invention is not limited to such embodiment and various modifications are conceivable without departing from the gist of the present invention.

For example, in the above-mentioned embodiments, the explanation has been made with respect to the example in which the one-pixel constitution of the TFT substrate 101 adopts the constitution shown in FIG. 3A to FIG. 3C as the example. However, the manufacturing method of the TFT substrate 101 explained in the embodiment is not limited to such a TFT substrate 101 and is also applicable to the manufacture of the TFT substrate 101 having the one-pixel constitution different from the one-pixel constitution shown in FIG. 3A to FIG. 3C.

Further, in the above-mentioned embodiment, the explanation has been made by taking the TFT substrate 101 used in the liquid crystal display device (liquid crystal display panel) as the example. However, the manufacturing method of the TFT substrate 101 explained in conjunction with the embodiment may be applicable to a manufacturing method of a substrate having the constitution substantially equal to the TFT substrate 101 used in the liquid crystal display device (liquid crystal display panel) and used in a display device which gives rise to similar drawbacks in a conventional manufacturing method. As another display device to which the manufacturing method of the TFT substrate 101 explained in conjunction with the above-mentioned embodiments is applicable, for example, a self luminous display device which uses organic EL (electroluminescence) elements as display electrodes corresponding to the pixel electrodes PX is considered.

The invention claimed is:

1. A display device comprising:
   a display panel having a plurality of scanning signal lines, a plurality of video signal lines, a plurality of thin film transistors and a plurality of pixel electrodes arranged in a matrix array, wherein
   in a state that a gap between two neighboring video signal lines with one pixel electrode out of the plurality of pixel electrodes sandwiched therebetween in a region where one pixel electrode is arranged is larger than a gap between two neighboring video signal lines with another pixel electrode different from one pixel electrode sandwiched therebetween in a region where another electrode is arranged, a size of one pixel electrode in the direction of the gap of the video signal lines is set larger than a size of another pixel electrode in the direction of the gap of the video signal lines, and
   wherein assuming a distance between two most spaced-apart pixel electrodes out of the plurality of pixel electrodes arranged in a matrix array as $L_{DA}$, the difference in etching quantity generated with respect to a size of the pixel electrode in the direction of the gap of the video signal lines at two positions spaced apart from each other by the distance $L_{DA}$ as $\sigma$, a size of one pixel electrode in the direction of the gap of the video signal lines as PXW, and a gap between one predetermined pixel electrode and the predetermined video signal line as $DPG_{min}$, the relationship between a gap DPGL between one pixel electrode and one video signal line out of two video signal lines and a gap DPGR between one pixel electrode and another video signal line out of two video signal lines satisfies following formula 1 to formula 3.

$$DPGL+\sigma/L_{DA}\cdot PXW > DPGR > DPGL-\sigma/L_{DA}\cdot PXW \quad \text{(formula 1)}$$

$$DPGL > DPG_{min}-\sigma/L_{DA}\cdot PXW \quad \text{(formula 2)}$$

$$DPGR > DPG_{min}-\sigma/L_{DA}\cdot PXW \quad \text{(formula 3)}$$

* * * * *